Aug. 7, 1956  B. MARCELLUS  2,757,874
SPOOLER TYPE WINDER
Filed March 2, 1953  21 Sheets-Sheet 2
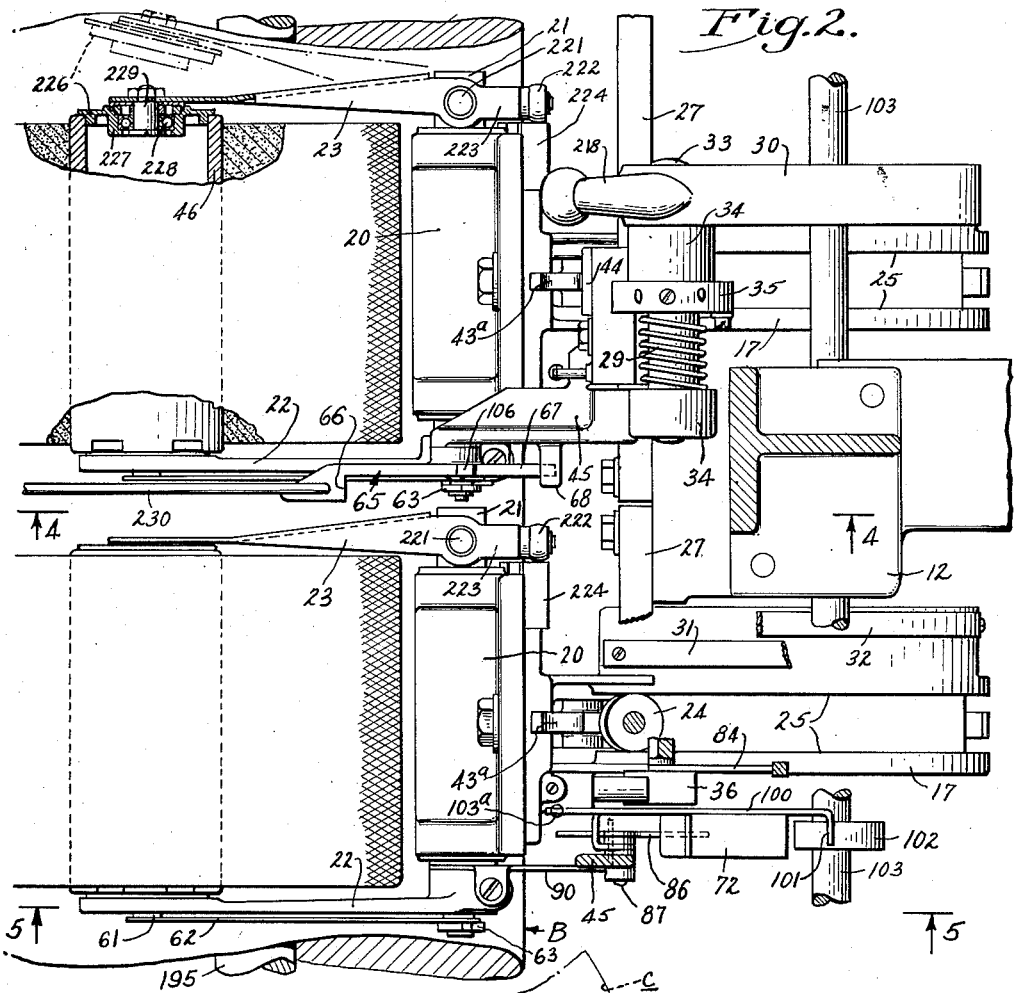
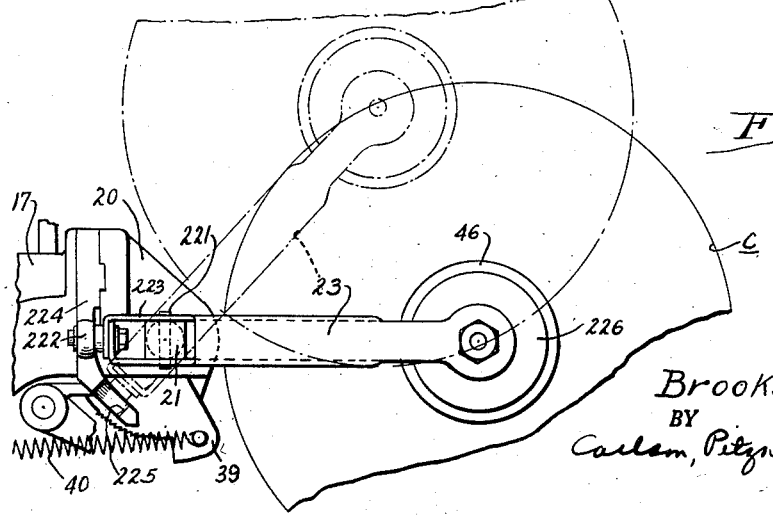
INVENTOR.
Brooks Marcellus
BY
ATTORNEYS INVENTOR.
Brooks Marcellus

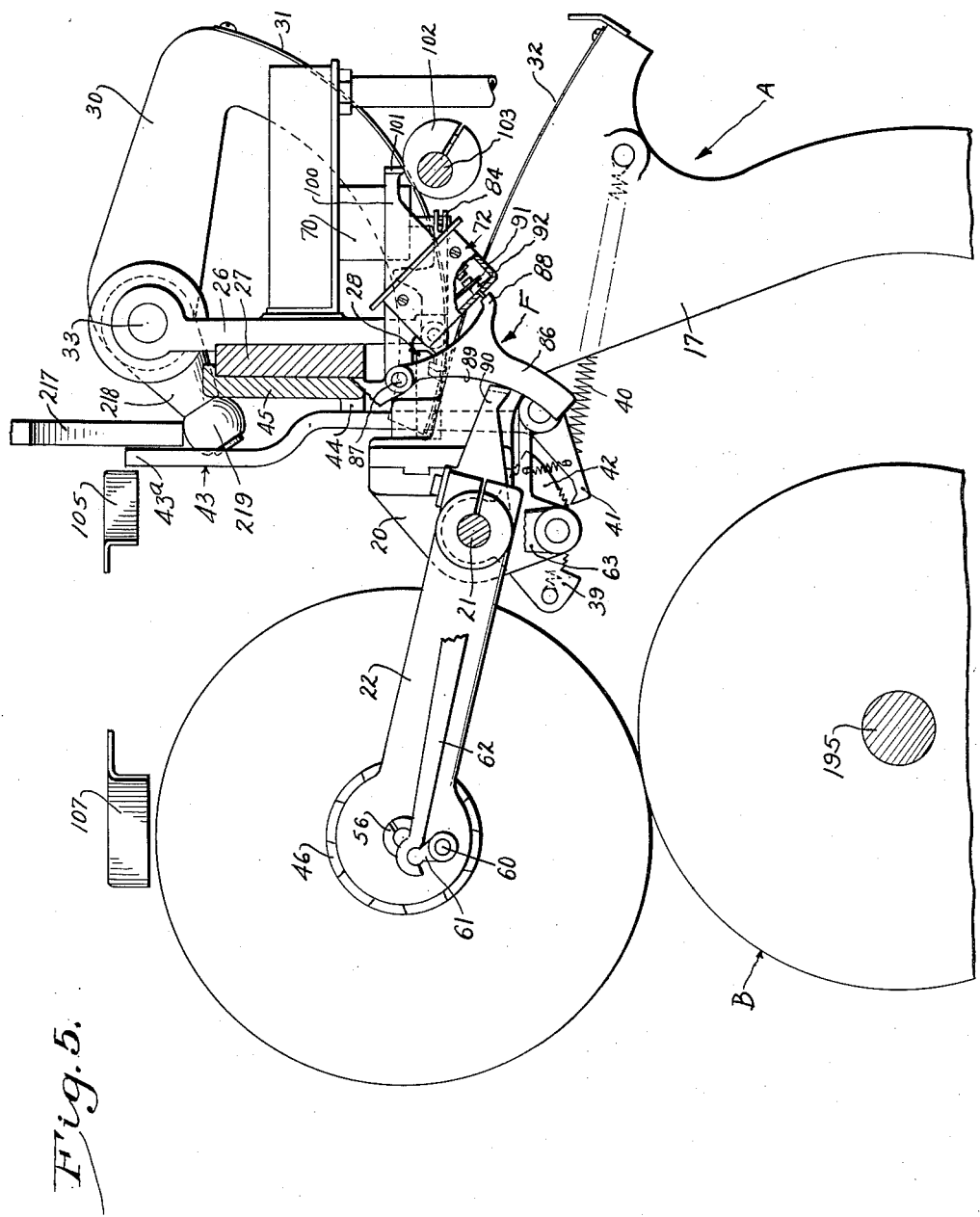

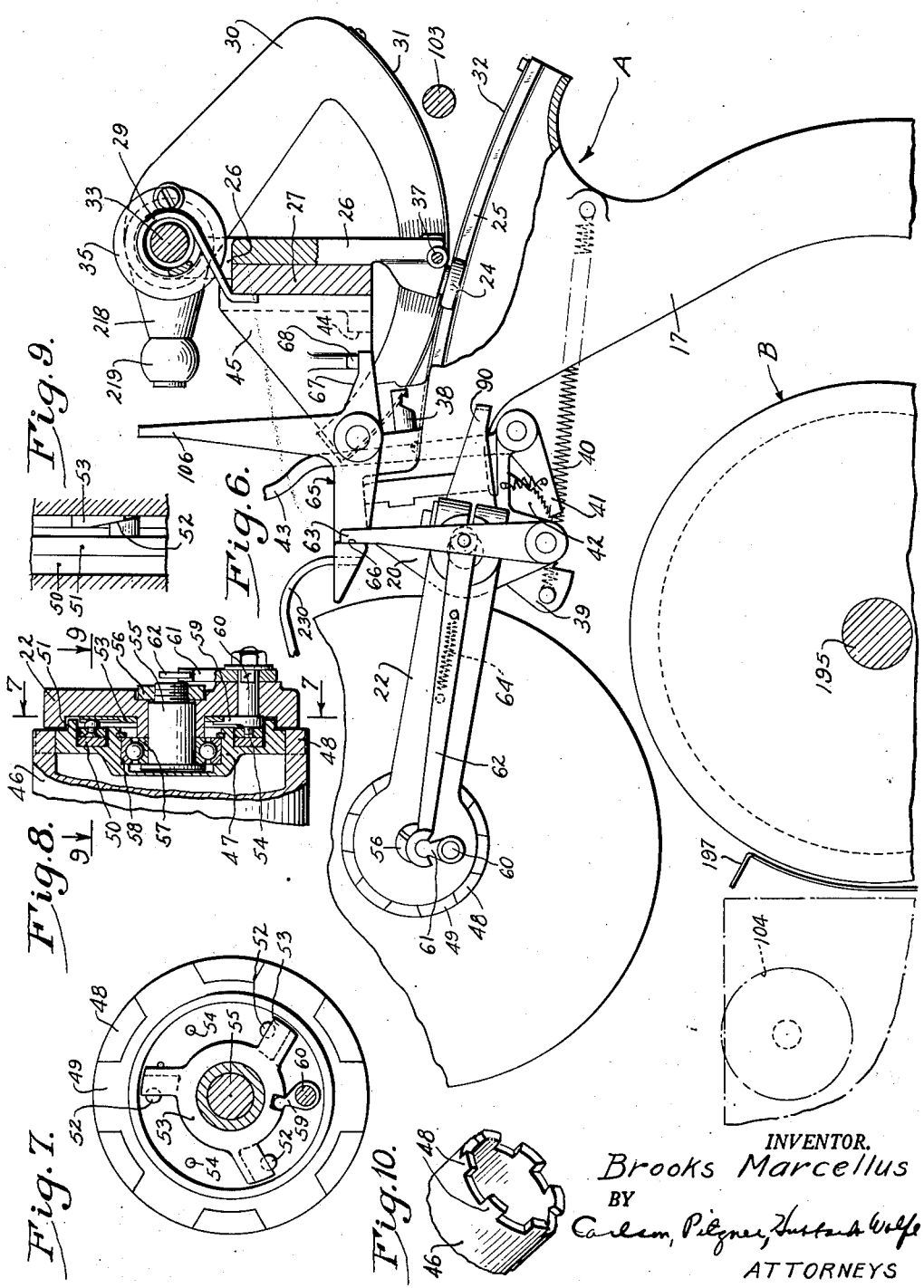

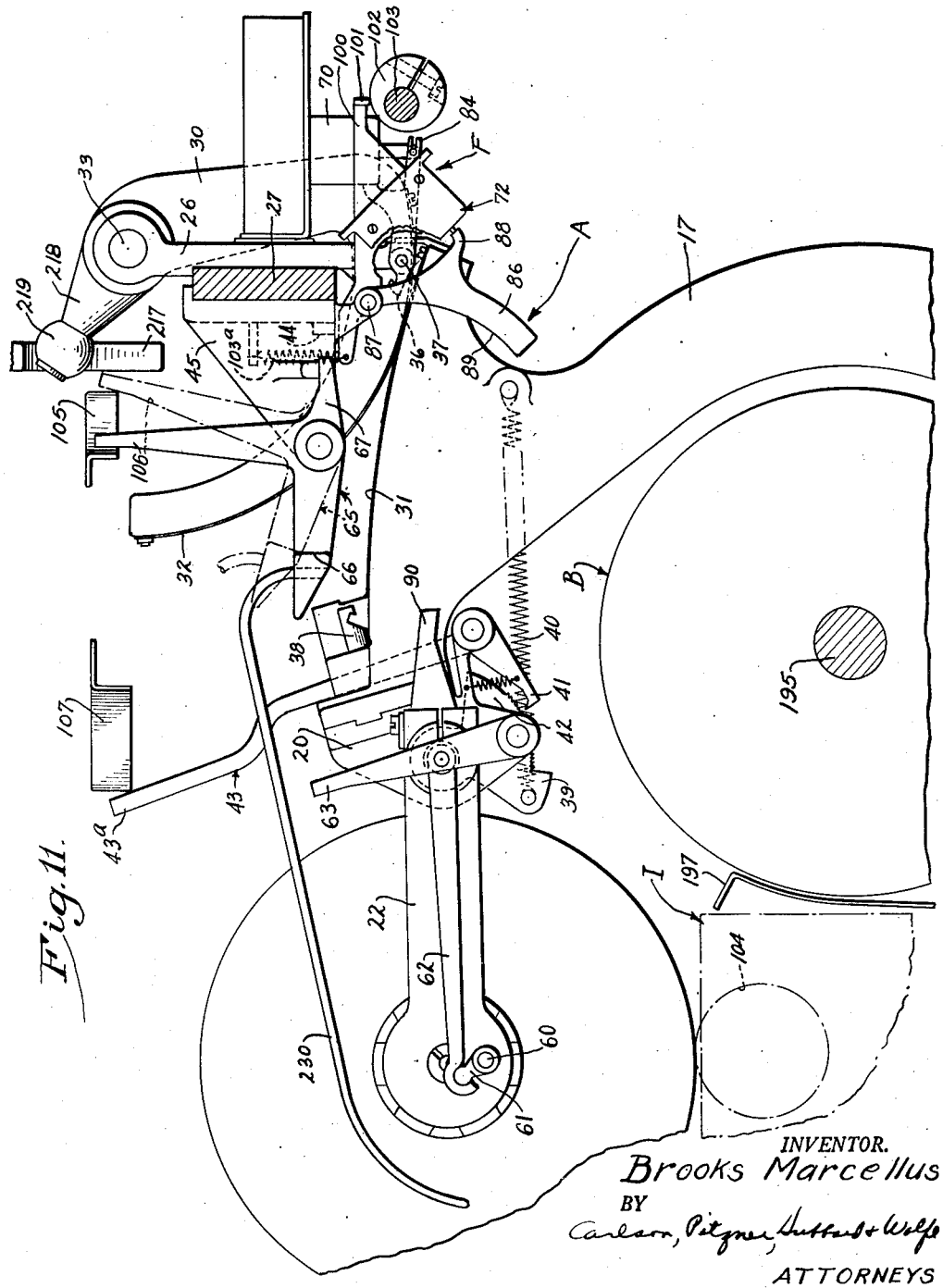

Aug. 7, 1956  B. MARCELLUS  2,757,874
SPOOLER TYPE WINDER
Filed March 2, 1953  21 Sheets-Sheet 7
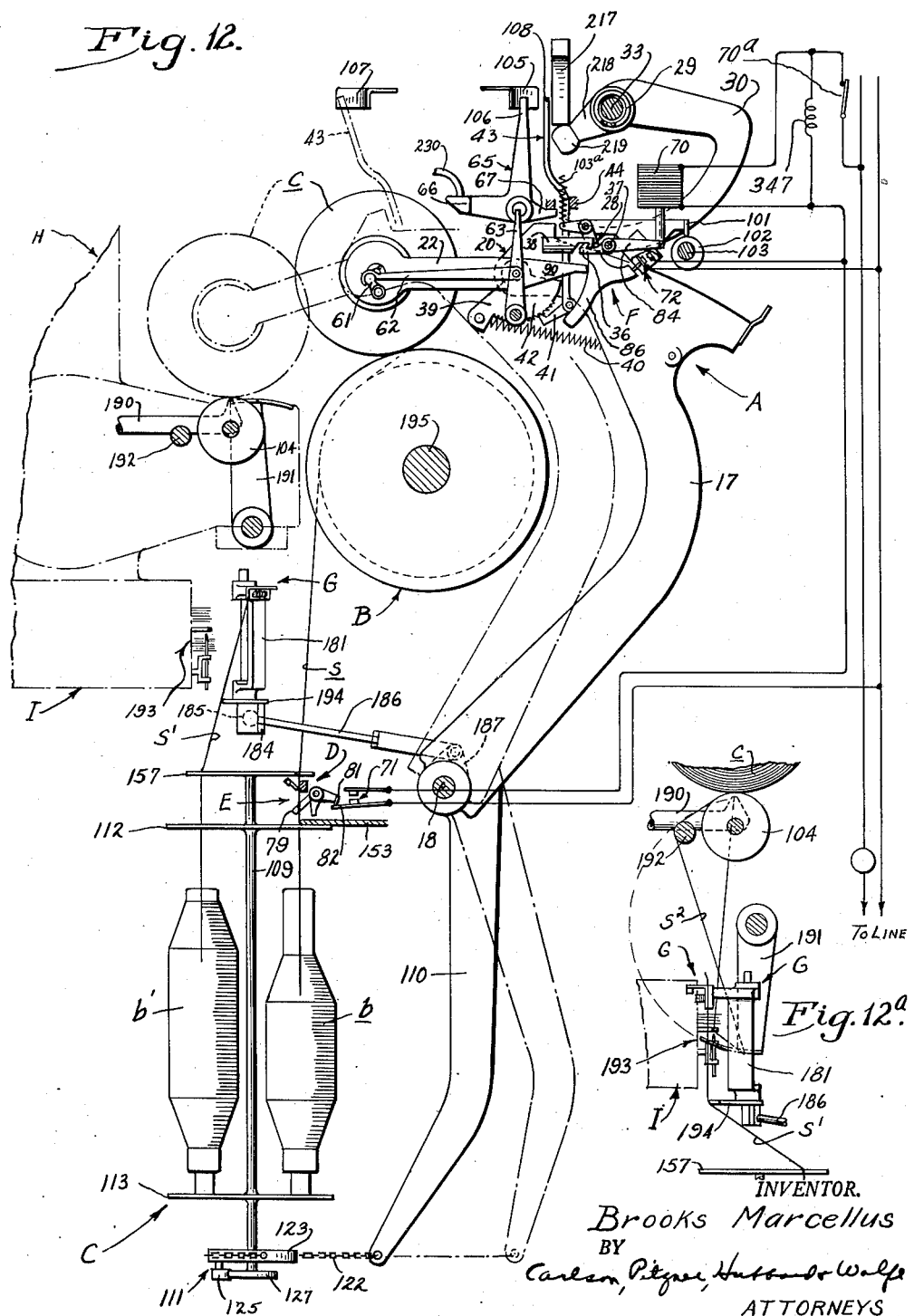

Aug. 7, 1956  B. MARCELLUS  2,757,874
SPOOLER TYPE WINDER
Filed March 2, 1953  21 Sheets-Sheet 8
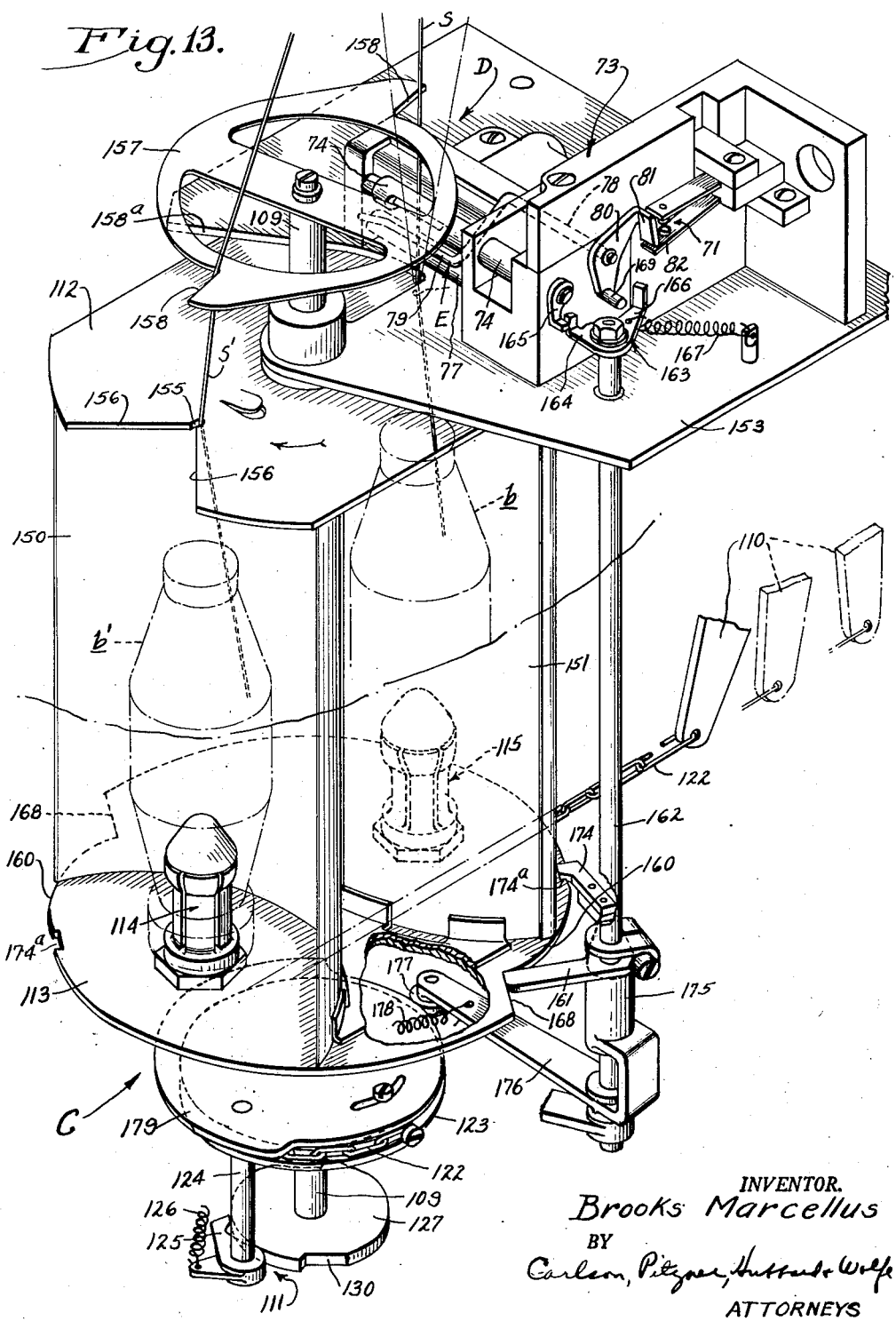
INVENTOR.
Brooks Marcellus
BY
Carlson, Pitzner, Hubbard & Wolfe
ATTORNEYS Aug. 7, 1956

B. MARCELLUS 2,757,874

SPOOLER TYPE WINDER

Filed March 2, 1953

INVENTOR.
Brooks Marcellus
BY
ATTORNEYS

Aug. 7, 1956

B. MARCELLUS 2,757,874

SPOOLER TYPE WINDER

Filed March 2, 1953

INVENTOR.
Brooks Marcellus
BY
ATTORNEYS

Aug. 7, 1956          B. MARCELLUS          2,757,874
                    SPOOLER TYPE WINDER
Filed March 2, 1953                    21 Sheets-Sheet 12

INVENTOR.
Brooks Marcellus
BY
ATTORNEYS

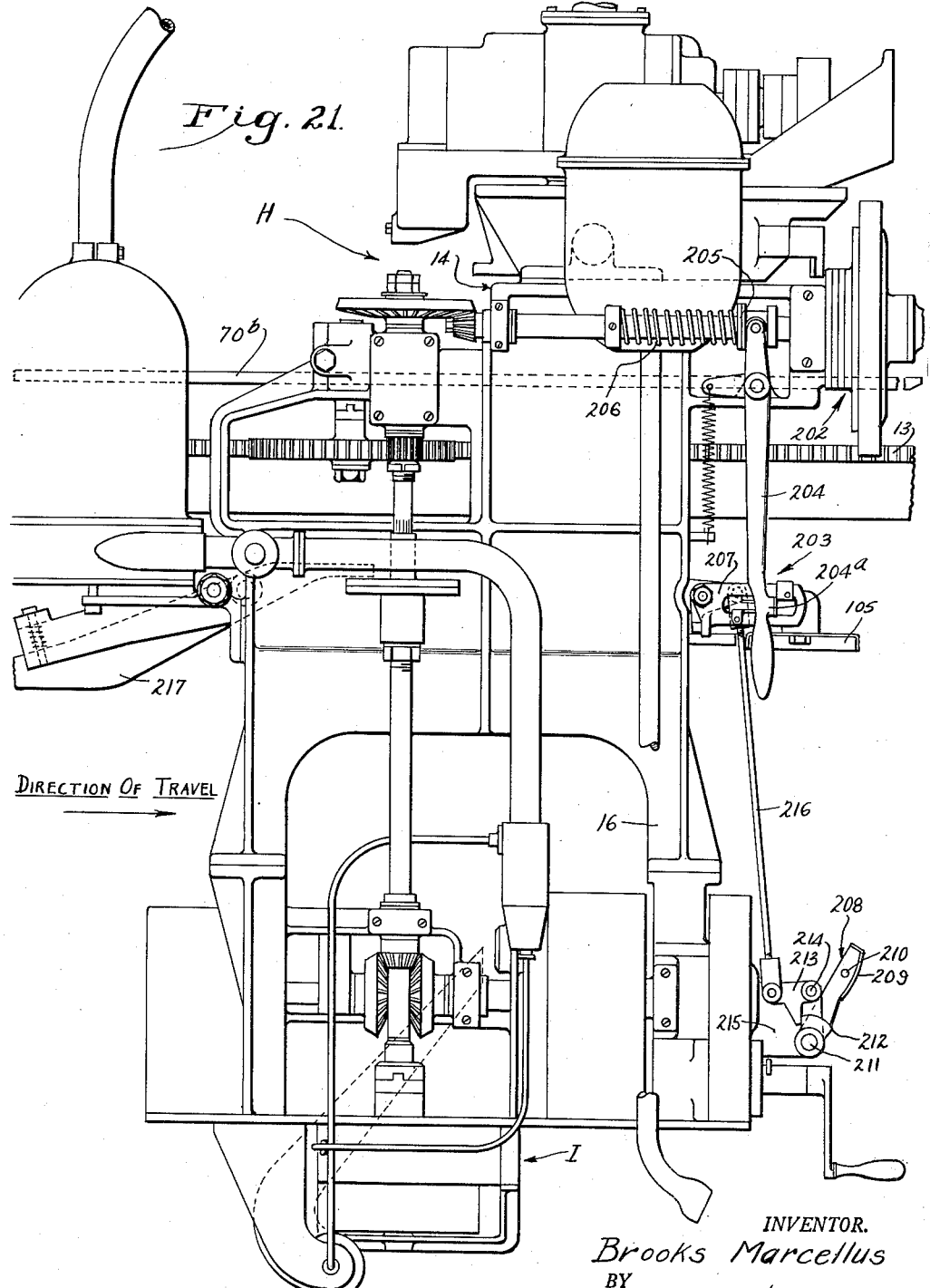

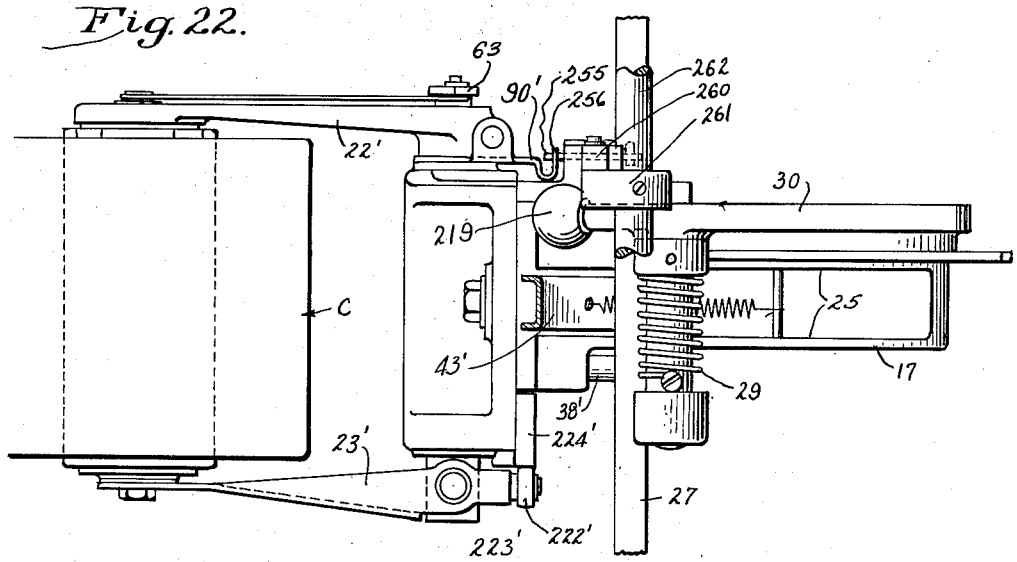
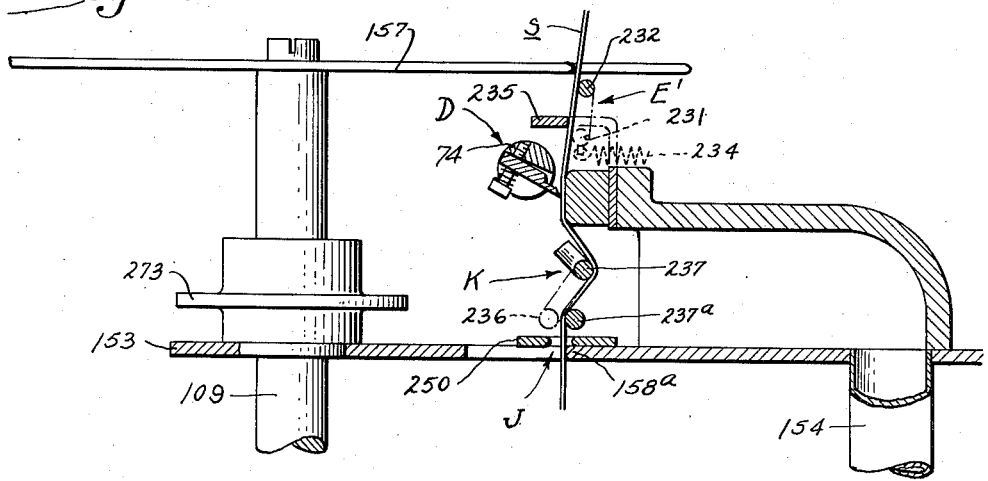
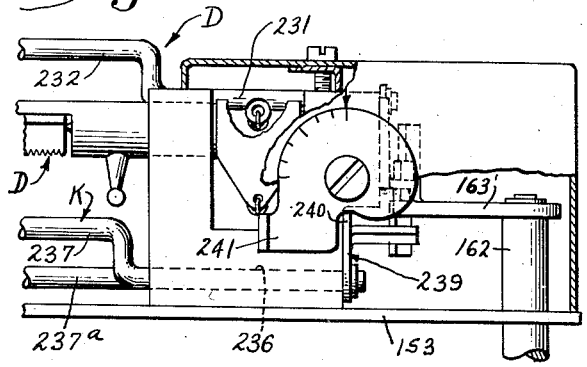

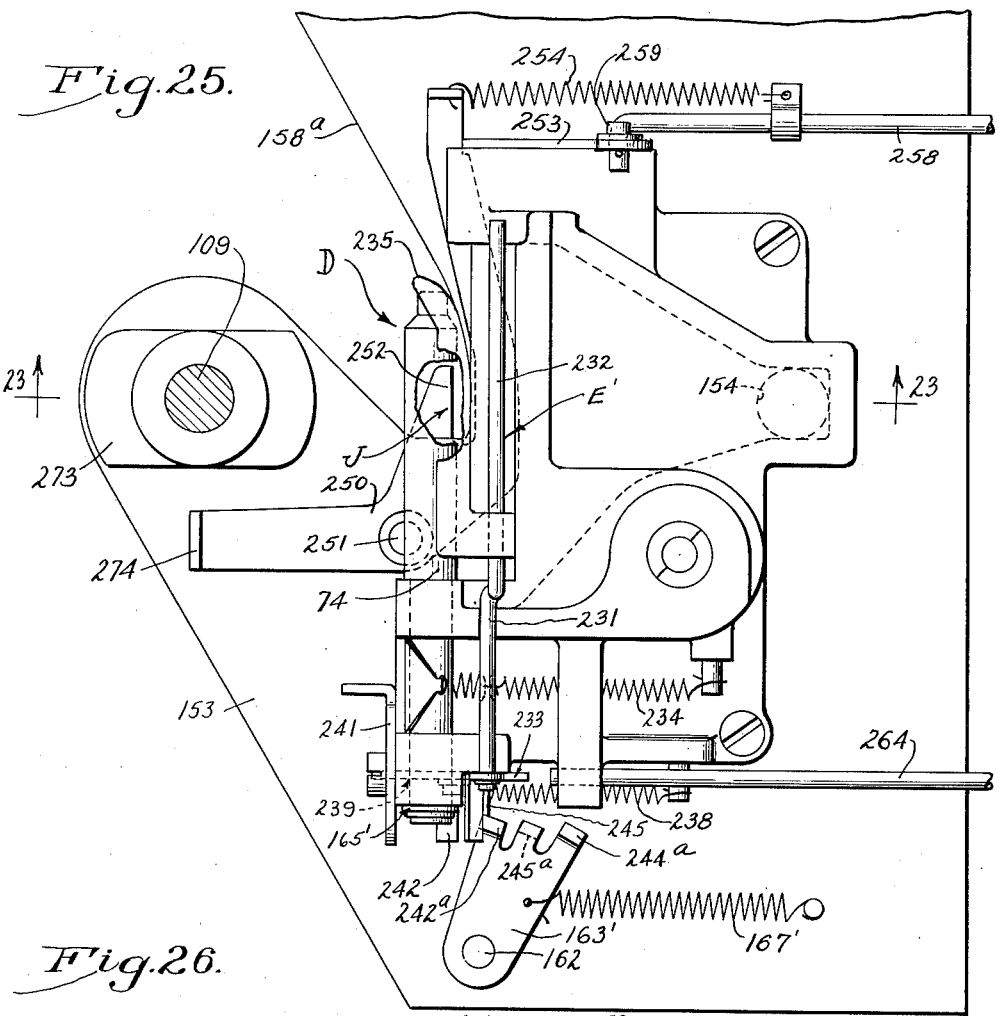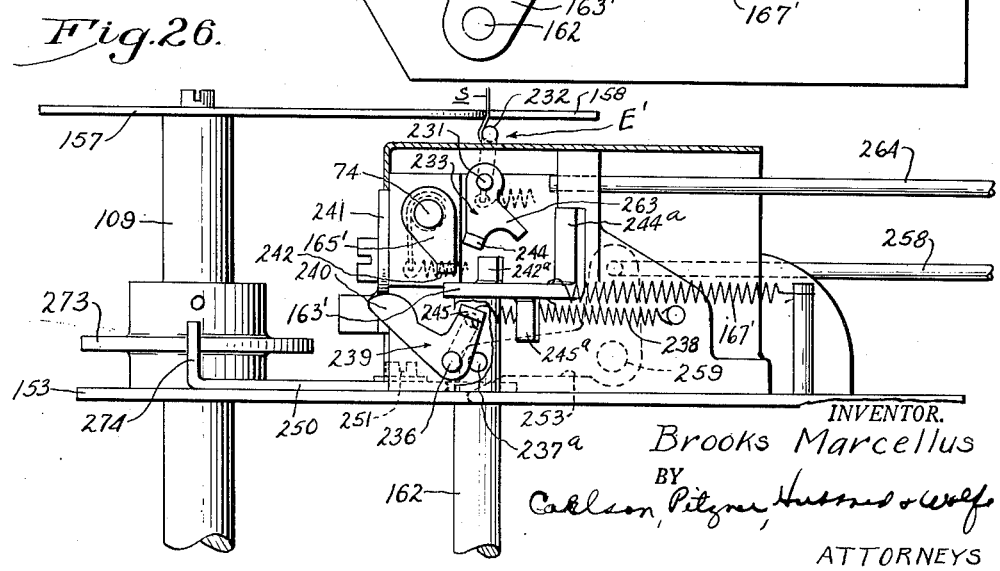

Aug. 7, 1956  B. MARCELLUS  2,757,874
SPOOLER TYPE WINDER
Filed March 2, 1953  21 Sheets-Sheet 19
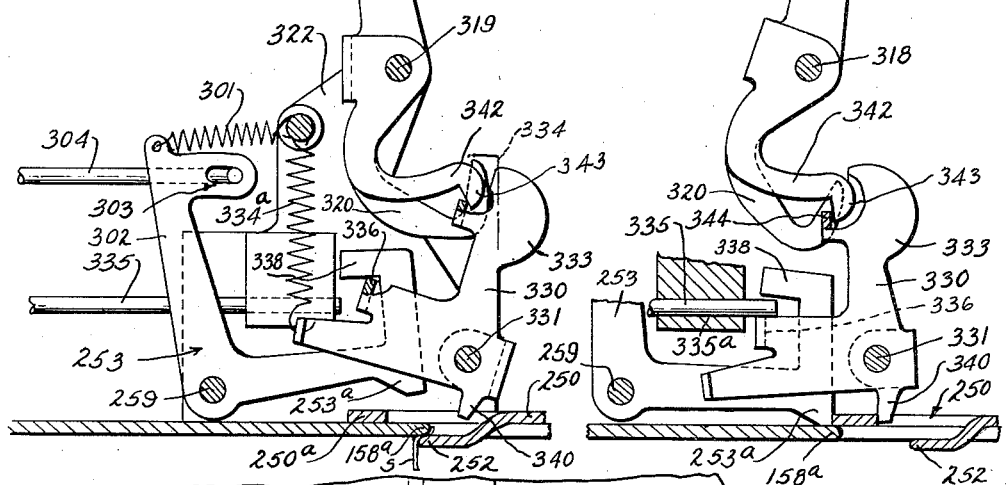
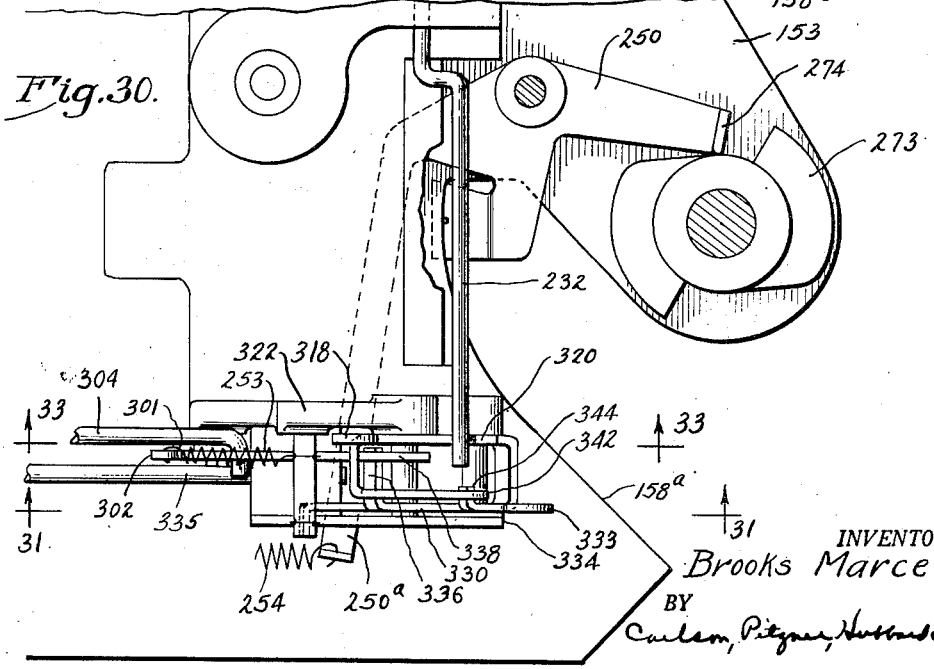
INVENTOR.
Brooks Marcellus
BY
ATTORNEYS

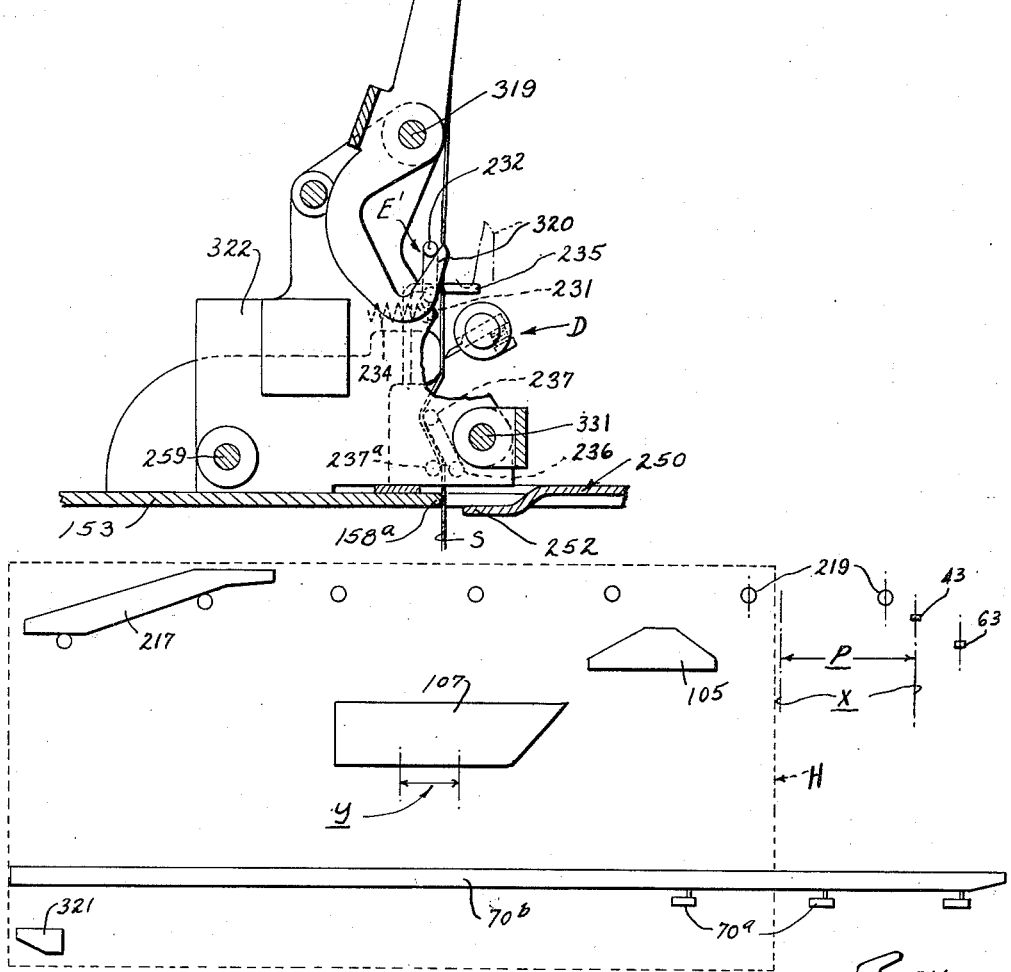

Aug. 7, 1956  B. MARCELLUS  2,757,874
SPOOLER TYPE WINDER

Filed March 2, 1953  21 Sheets-Sheet 21

INVENTOR.
Brooks Marcellus
BY
Carlson, Pitzner, Hubbard & Wolfe
ATTORNEYS

United States Patent Office 2,757,874
Patented Aug. 7, 1956

2,757,874

SPOOLER TYPE WINDER

Brooks Marcellus, Rockford, Ill.

Application March 2, 1953, Serial No. 339,585

39 Claims. (Cl. 242—35.6)

The invention pertains to winding machines of the character disclosed in Colman Patent No. 1,267,977, in which relatively large yarn masses commonly called "cheeses" are built up from yarn drawn successively from a number of smaller packages or bobbins, a tying operation being performed upon the interruption of the running strand due to breakage or exhaustion of the yarn supply during the winding operation so that the cheeses being produced will consist of a single continuous strand of yarn.

Machines of this type are commonly referred to as "spoolers." In brief, they comprise a series of winding units each including a bobbin holder and a cheese supporting and driving means, together with a tying unit, the construction and arrangement being such that in a relative traveling movement between the winding units on the one hand and the tying unit on the other, tying operations are performed automatically under the varying conditions encountered in use.

The primary object is the provision of a machine for winding large size cheeses from bobbins substantially larger in size than conventional bobbins.

In textile manufacturing operations a multiplicity of cheeses are individually mounted in a frame or creel and their strands simultaneously wound in contiguous relation upon warp beams which constitute the source of supply of the warp for the loom. Cheeses of the size heretofore used commonly supply strands of yarn of a length sufficient for a single beam with the result that for each beam wound a new supply of cheeses must be placed in the creel. Such replacement of cheeses in the creel is a time consuming operation. An ancillary object of this invention, therefore, is to provide a winder especially adapted for the production of cheeses of large size with sufficient yarn for filling several warp beams.

In prior winding machines the winding units are subjected to the operation of the tying mechanism successively upon the termination of a time interval calculated on the basis of the time required to exhaust a bobbin in the absence of any interruption of the running strand. For example, in the machine of the said Colman patent the winding units are mounted upon a frame having an endless track and the tying unit is in the form of a traveler which is started in operation upon the conclusion of the predetermined winding period, so as to operate upon the various winding units successively. The traveler comes to rest in a predetermined position after making the complete circuit and remains in such idle position until the expiration of the predetermined time interval during which the yarn from one set of bobbins is consumed or exhausted in the normal winding operation. Frequently, however, the yarn being unwound from a bobbin onto a cheese becomes broken due to weak points in the yarn or to the fact that the running strand in passing through a yarn clearing device or "snick plate" becomes broken in the operation of detecting the presence on the yarn of "gouts" or other enlargements. Breakage of the strand under such conditions may, of course, occur at any time during the winding period with the result that any given winding unit may remain out of operation for a substantial part of the winding period. With the foregoing in view, another object of the invention is to increase the efficiency of the winder by minimizing the idle periods for the various winding units and thus render practicable the production of cheeses substantially larger in size than heretofore from bobbins of correspondingly larger size.

In its preferred embodiment my invention is incorporated in a machine of the Colman type above referred to in which the tying unit is mounted for traveling movement into operative association successively with a series of stationary winding units. Not only is the tying unit mounted for traveling movement, but the construction and mode of operation thereof is in all material and substantial respects the same as that disclosed in said Colman patent so that it has been deemed unnecessary to illustrate and describe the same in detail.

Referring now to the drawings:

Fig. 2 is a fragmentary plan view on an enlarged scale in which two winding units are shown, certain of the parts being shown in section.

Fig. 3 is a fragmentary side elevational view showing the cheese supporting or sustaining means and illustrating the manner in which the cheese may be lifted manually from its winding position, the winding unit illustrated being one on the right hand side of the machine as shown in Fig. 1.

Fig. 5 is a similar view at a different time in the winding operation, the view being taken approximately in the plane of line 5—5 of Fig. 2.

Fig. 6 is a view similar to Fig. 5 but showing a wound cheese shifted out of driving contact with its supporting and driving drum or into a position hereinafter referred to as the "braking position."

Figs. 7, 8, 9, and 10 illustrate a braking mechanism for stopping rotation of the cheese when shifted into its braking position. Fig. 7 is a sectional view taken approximately in the plane of line 7—7 of Fig. 8. Fig. 8 is a fragmentary elevational view of one end of a cheese core with the extreme end broken away and shown in section to illustrate the brake mechanism. Fig. 9 is a transverse sectional view somewhat schematic in character and taken approximately in the plane of line 9—9 of Fig. 8. Fig. 10 is a fragmentary perspective view of the end of the core.

Fig. 11 is a transverse sectional view similar to Fig. 5 but showing the cheese advanced from braking position into what is hereinafter referred to as the "tying position."

Fig. 12 is a side elevational view of the winding unit and somewhat schematic in form.

Fig. 12a is a detailed view showing the relation of the running strand and the reserve strand during the tying operation.

Fig. 13 is a fragmentary perspective view of a means for supporting the active and reserve bobbins termed herein for convenience a bobbin holder and shown in association with the snick plate for cleaning the yarn and detector responsive to the interruption of the running strand.

Figure 14:
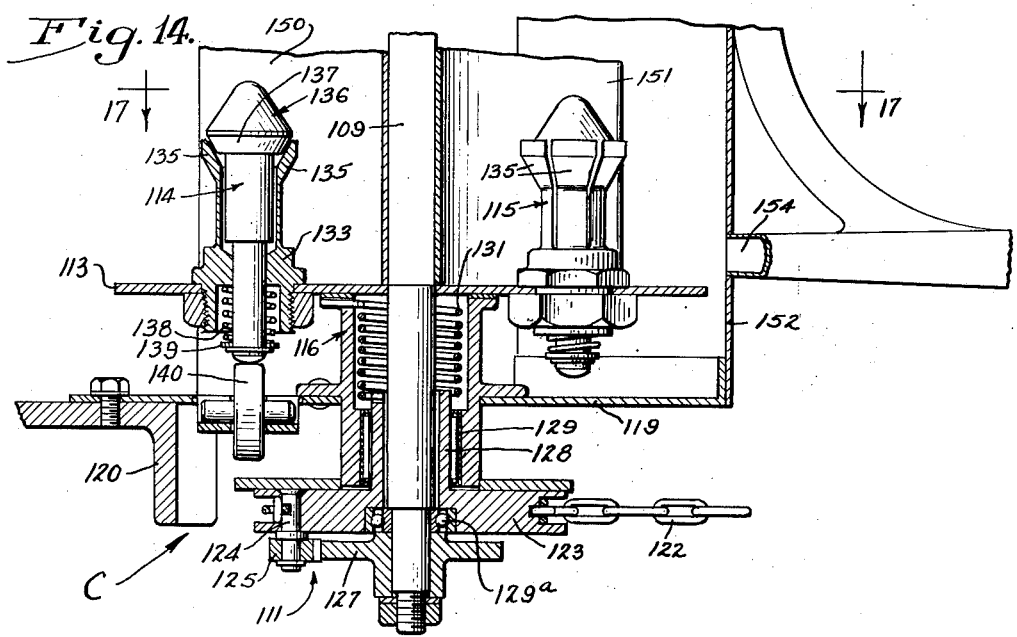

Fig. 14 is a fragmentary vertical sectional view through the bobbin holder.

Figure 15:
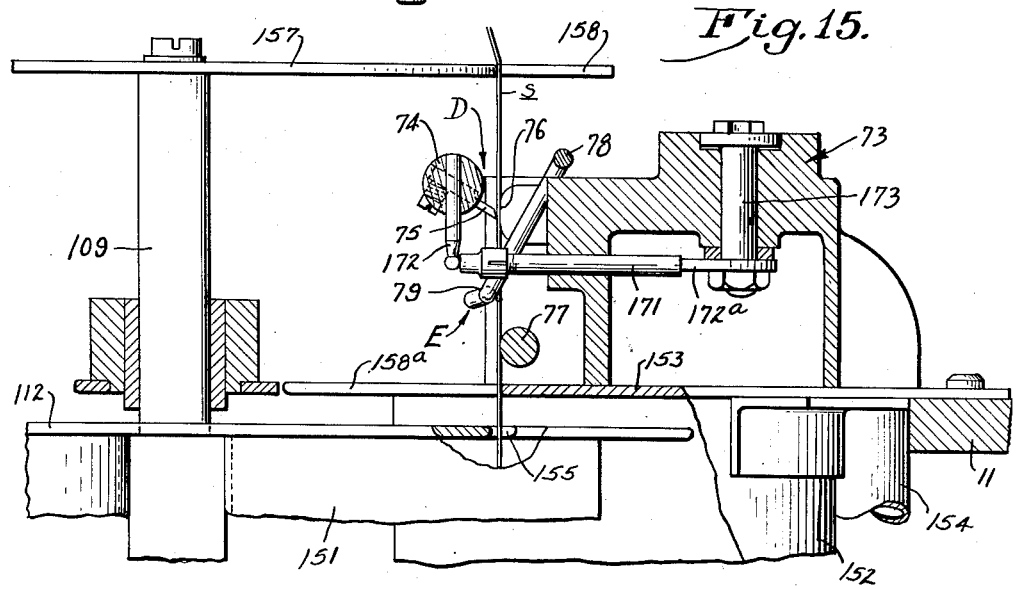

Fig. 15 is a vertical sectional view illustrating the construction of the snick plate.

Figure 16:
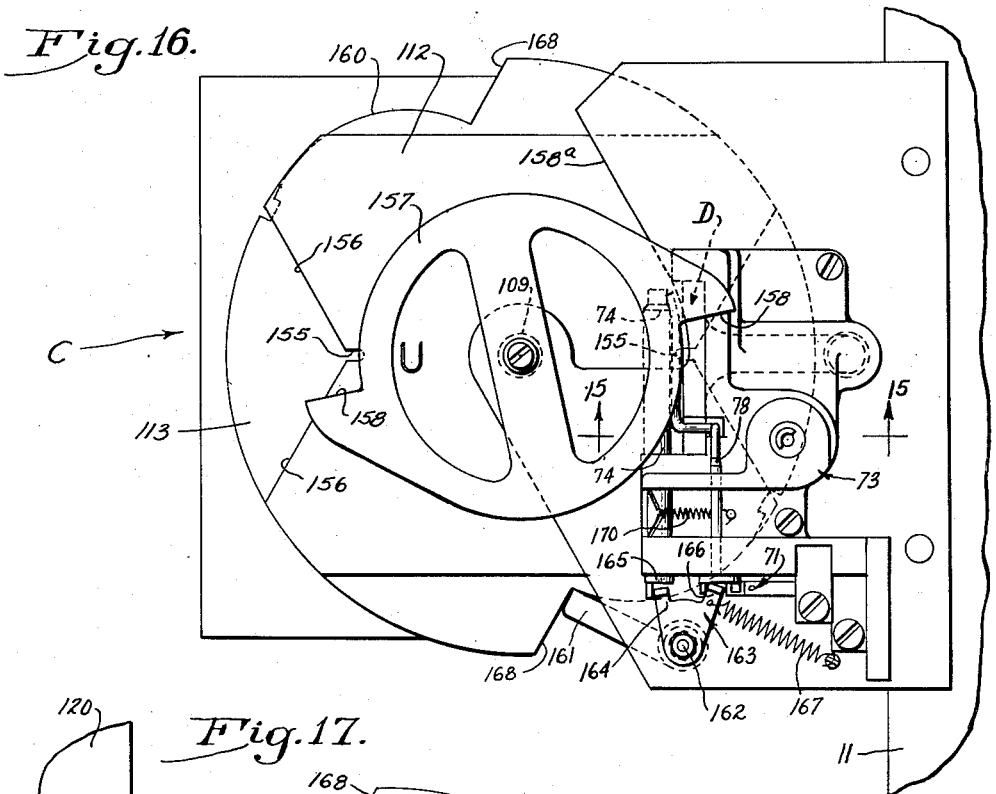

Fig. 16 is a plan view of the bobbin holder, snick plate, etc., shown in Fig. 13.

Figure 17:
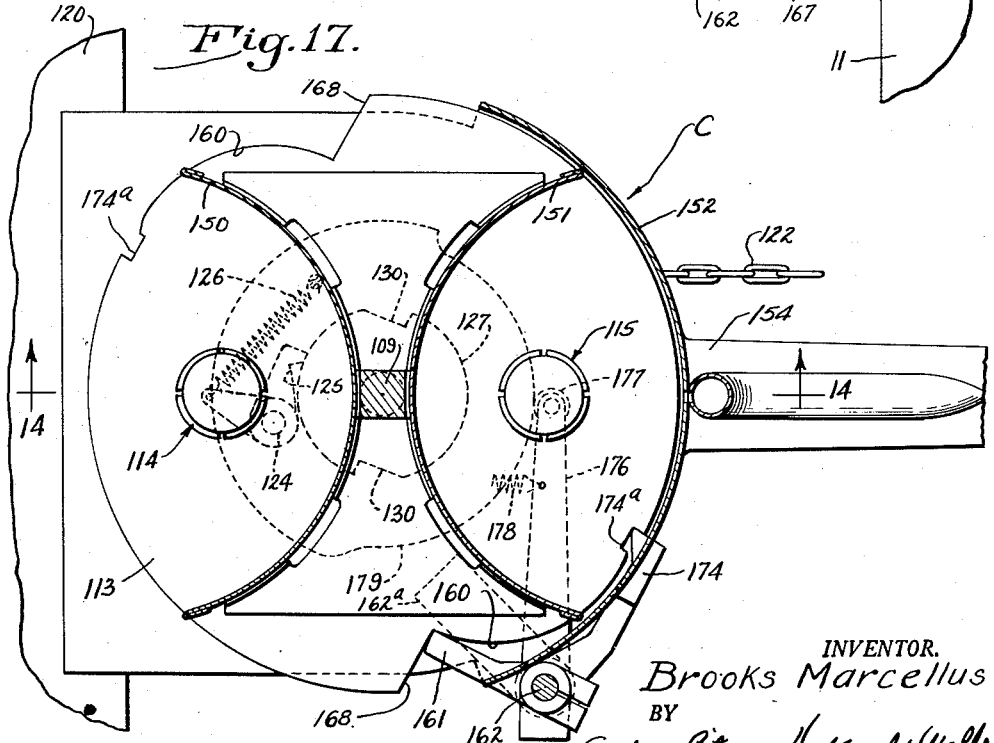

Fig. 17 is a transverse sectional view through the bobbin holder taken approximately in the plane of line 17—17 of Fig. 14.

Figure 18:
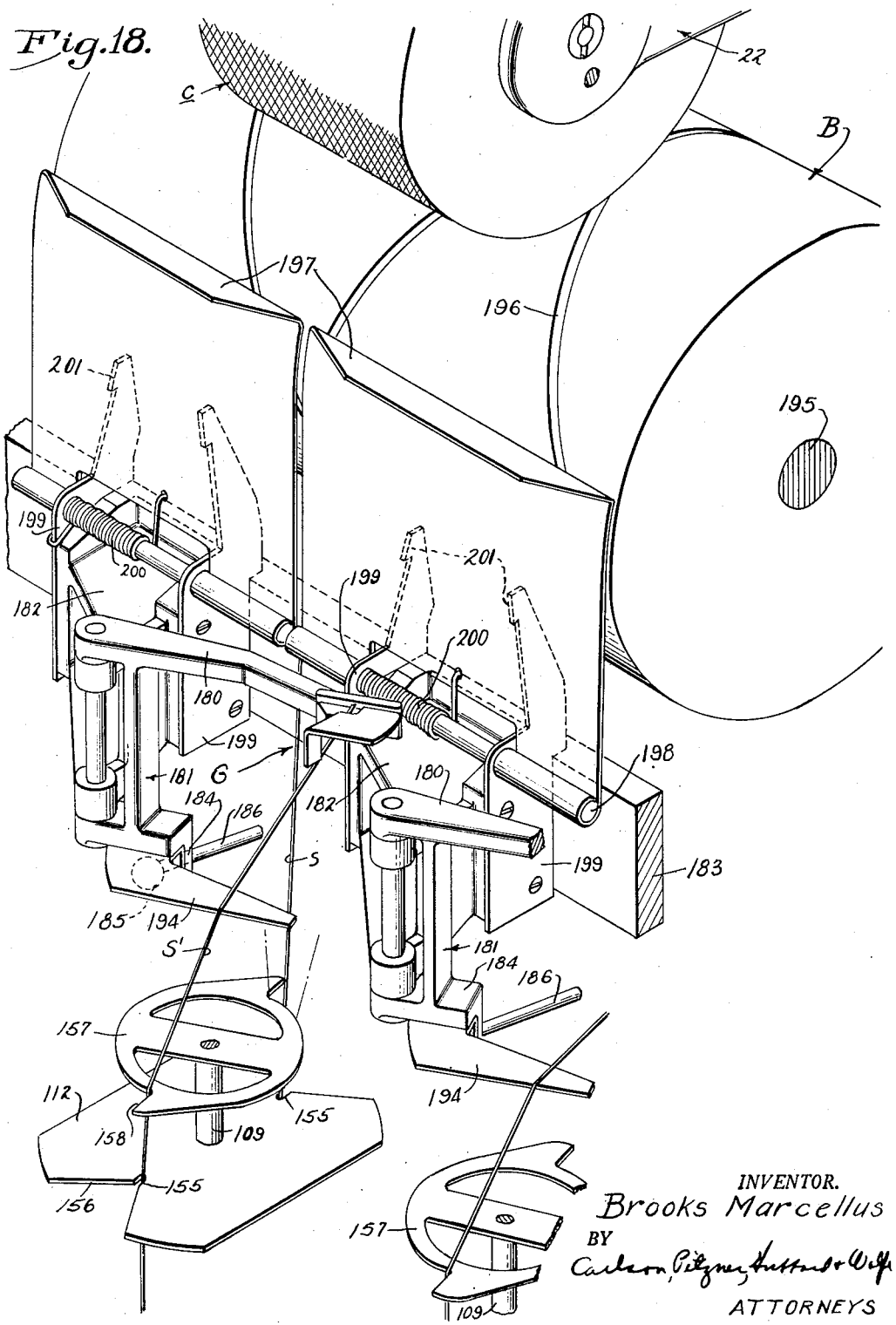

Fig. 18 is a perspective view illustrating especially the reserve thread clamp in combination with a strand positioning device on the bobbin holder or carrier.

Figure 19:
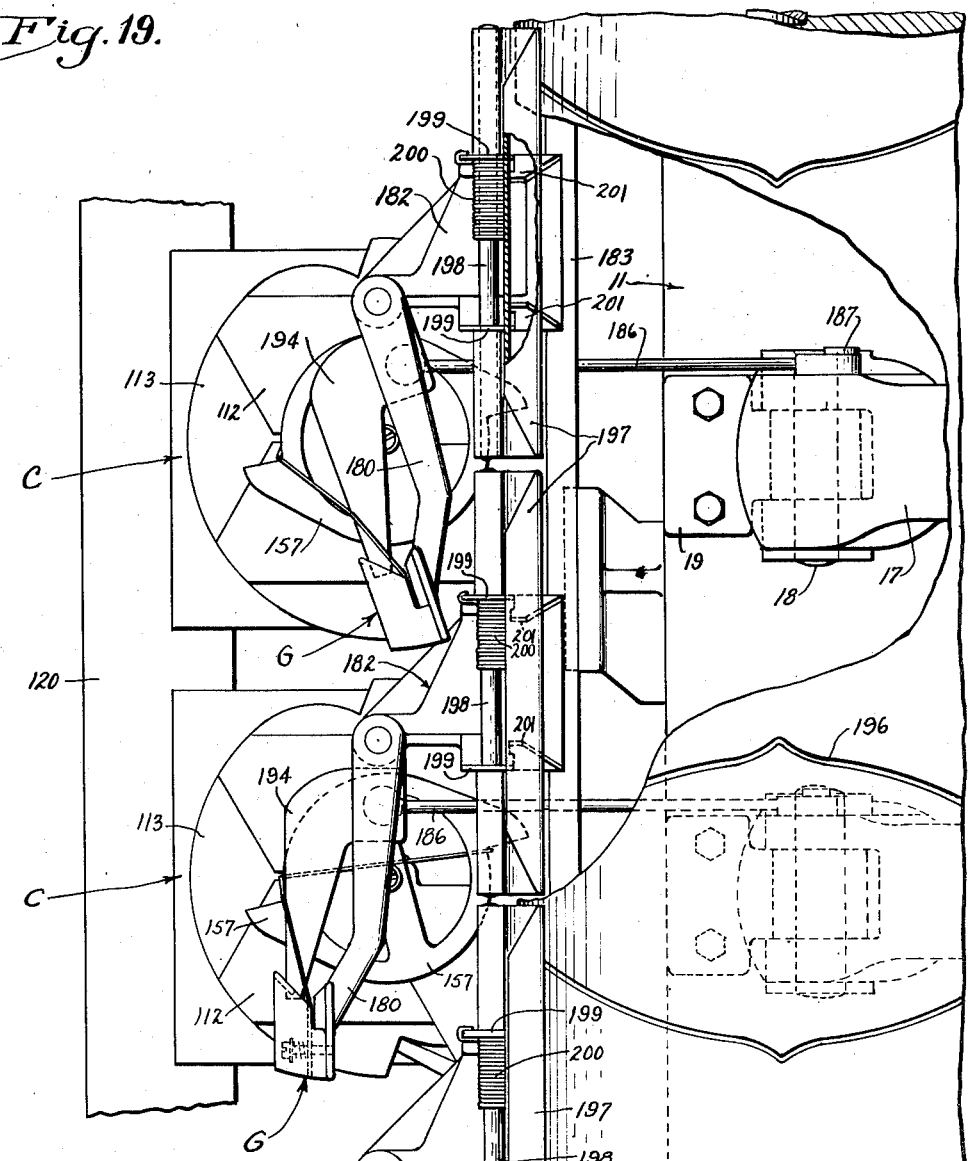

Fig. 19 is a plan view showing two winding units and the reserve thread clamps thereof in different positions.

Figure 20:
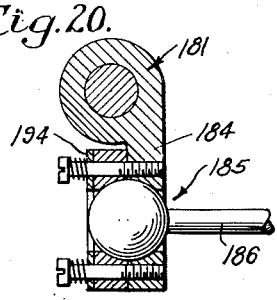

Fig. 20 is a detail section illustrating the connection between the thread clamp and its actuator.

Fig. 21 is a front view of the traveler.

Figs. 22 to 28 inclusive illustrate an alternative construction for controlling the release of the bobbin carrier from its winding position. Thus:

Fig. 22 is a fragmentary plan view of the bobbin carrier and its associated bobbin holding means. Fig. 23 is a fragmentary vertical sectional view through the upper portion of the bobbin holder, the snick plate, and the exhausted thread detector taken along the line 23—23 of Fig. 25. Fig. 24 is a fragmentary front elevational view of the snick plate and exhausted thread detector.

Fig. 25 is a fragmentary plan view of the same.

Fig. 26 is an end view of the mechanism shown in Fig. 25.

Figure 27:
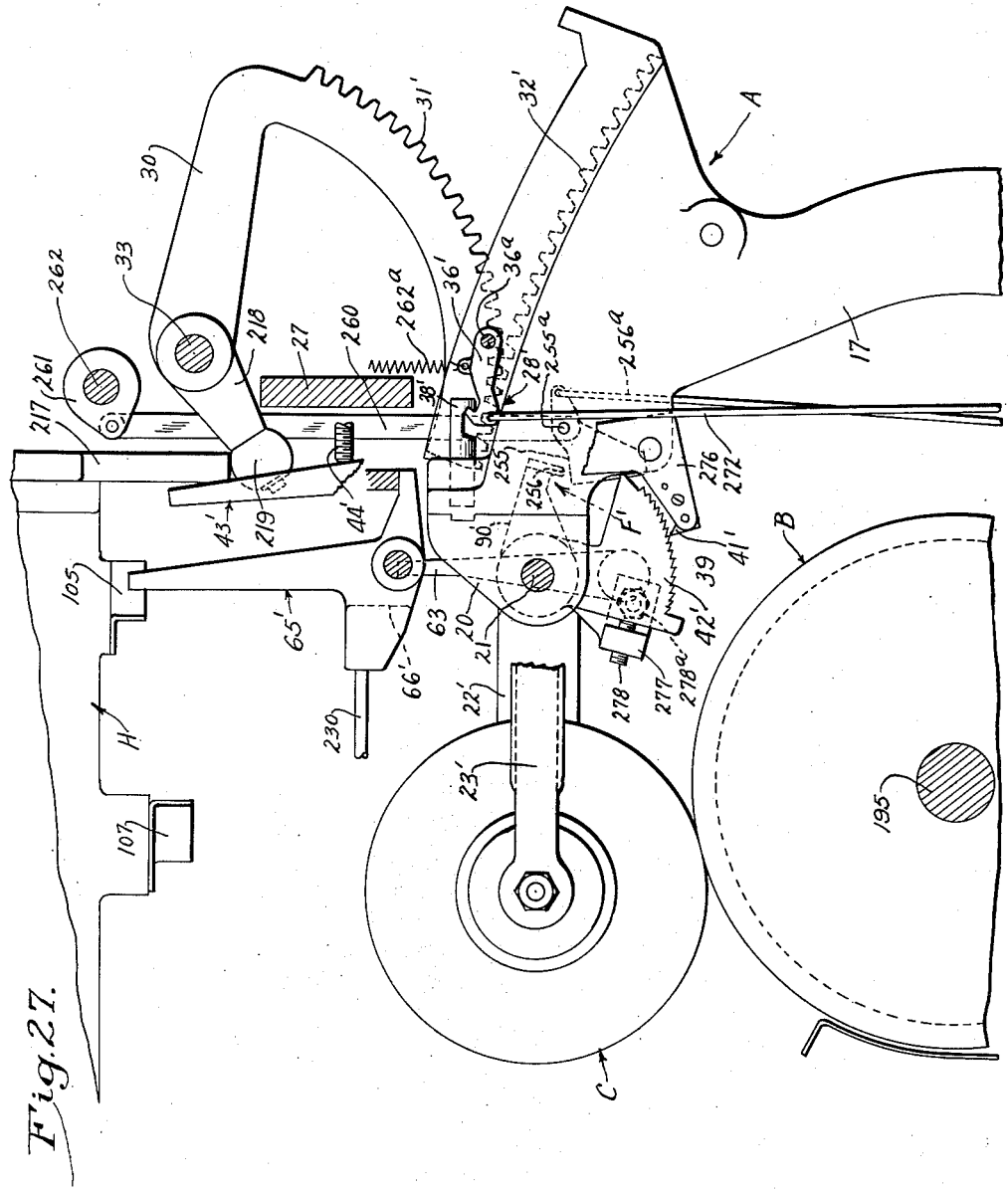
Figure 28:
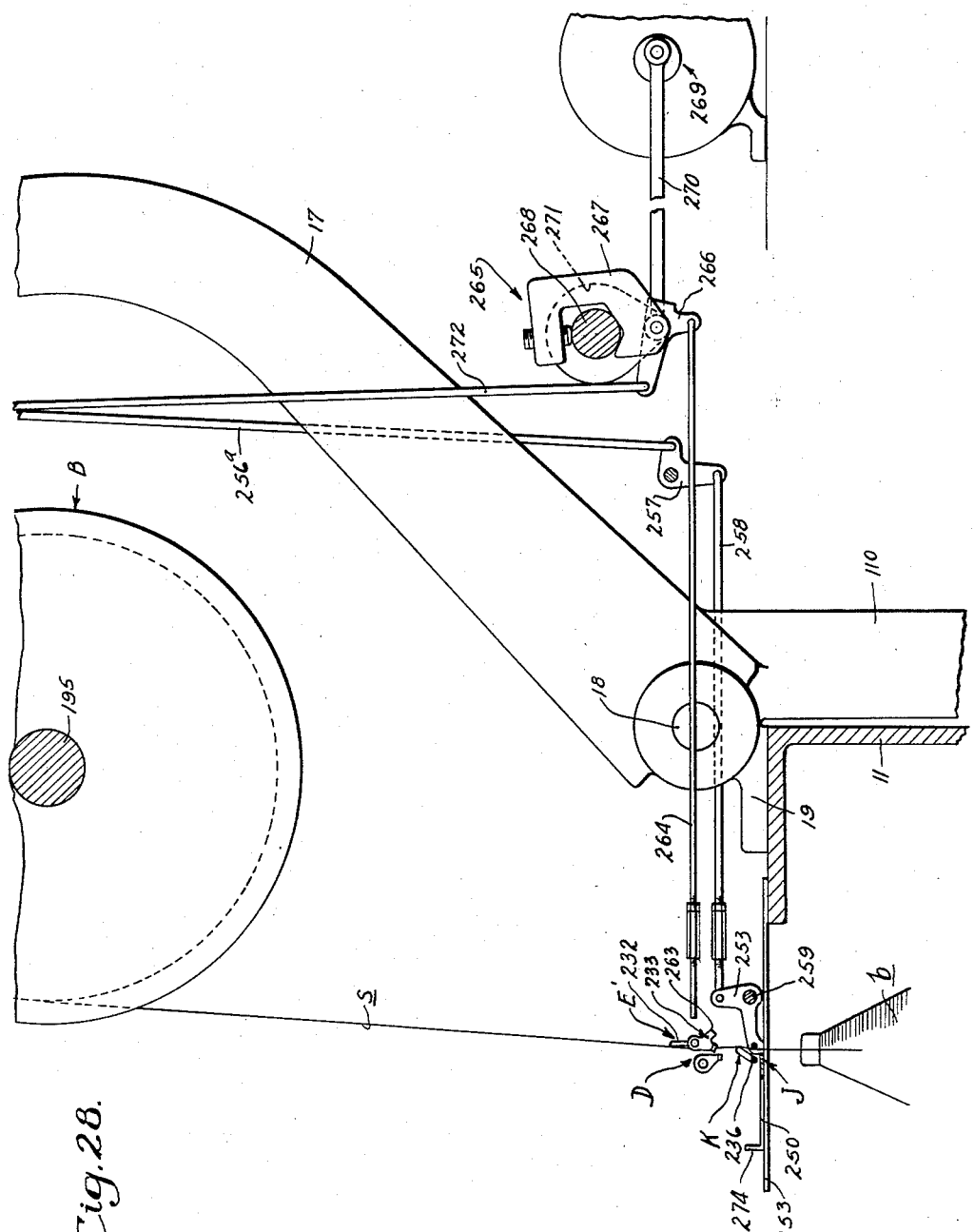

Figs. 27 and 28 are fragmentary vertical sectional views together showing a mechanical form of control mechanism responsive to the exhausted thread detector and a full size cheese detector controlling the operation of a clamping device for forcing a break in the running strand.

Figure 29:
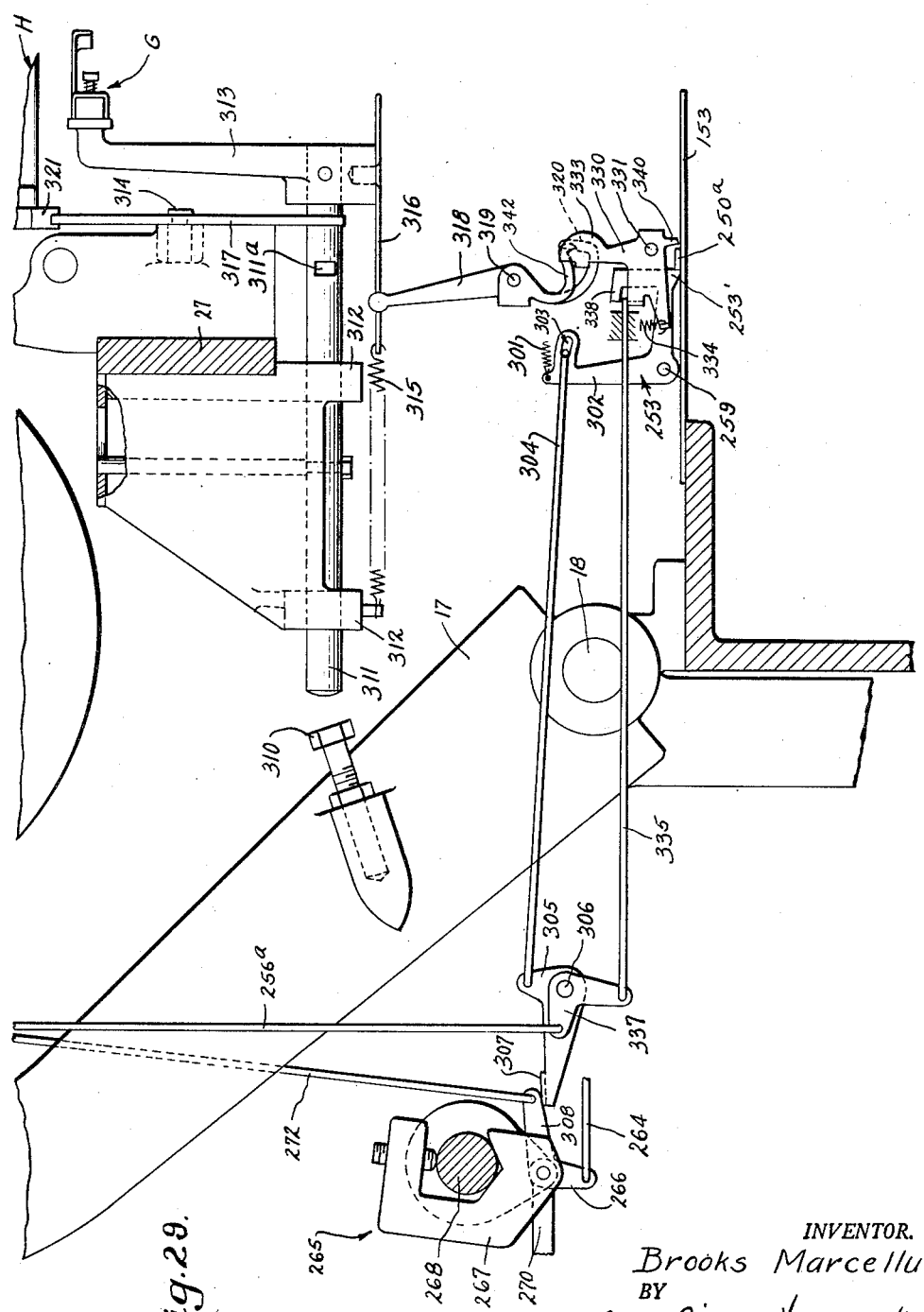

Fig. 29 is a view similar to Fig. 28 but in the opposite direction showing a modified form of the thread break detecting mechanism.

Fig. 30 is a fragmentary plan view of the thread break detector of one of the winding units.

Figs. 31 and 32 are fragmentary sections taken along the line 31—31 of Fig. 30.

Fig. 33 is a similar section taken along the line 33—33 of Fig. 30.

Fig. 34 is a schematic view showing the relative spacing of the different cams on the end finding and knot-tying unit and the followers of the respective units.

Figure 35:
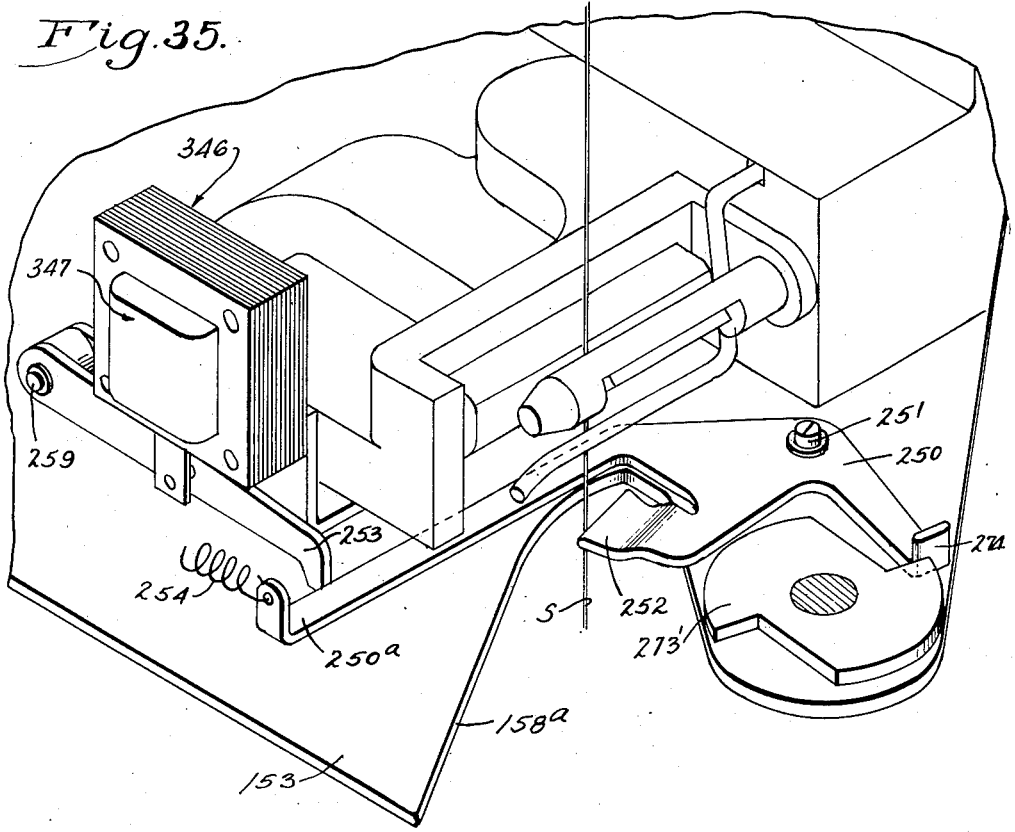

Fig. 35 is a fragmentary perspective view of a modification form of the mechanism for forcing a thread break following detection of a full cheese.

While the improved winder differs in many important respects from that of the Colman patent aforesaid, a feature of outstanding importance resides in the elimination of any idle time for the tying unit through provision of a construction and arrangement permitting a continuous relative traveling movement between the winding units on the one hand and the tying unit on the other. Thus, in the instant embodiment the tying unit performs a constant patrolling function, acting selectively only upon those winding units which, for any reason, are idle so as to restore them to operation with a minimum lapse of time while by-passing all of those units which are performing the intended winding operation.

The selective action of the tying unit or "traveler" when presented to the successive winding units is governed by feelers associated with each winding unit for sensing the interruption of the thread between the cheese and bobbin or the growth of the cheese to a desired diameter. The device operates automatically to condition the tying and winding units on the one hand for active engagement to tie a new thread to the cheese and restart the winding thereof or on the other hand to prevent such engagement and cause the traveler to by-pass each winding unit whose cheese is being wound properly.

Preferably the automatic conditioning of the individual winding units for operation of the traveler thereon is effected by movement of the cheese carrier out of its winding position to an intermediate or braking position pending final movement into tying position under the control of the tying unit or "traveler," a brake mechanism being provided to arrest rotational movement of the cheese in its braking position.

Coincident with the movement of a cheese into its tying position (Fig. 11, a bobbin holder containing both active and reserve bobbins is actuated to carry the reserve bobbin into active position and the previously active bobbin into reserve position for removal and replacement by the attendant. For convenience, the end of the yarn on the reserve bobbin and the loose end of the yarn on the cheese are hereinafter referred to respectively as the reserve thread and the exhausted thread.

In the aforesaid actuation of the bobbin holder a clamp holding the reserve thread is shifted to carry the same outwardly into position to be united with the exhausted thread in the operation of the tying unit. At the same time, the portion of the reserve thread between the clamp and the reserve bobbin is automatically carried into proper operative relation to the yarn clearing and tensioning devices as well as to the means for detecting an interruption in the running strand due to exhaustion or breakage.

Proceeding now to a more detailed consideration of my invention as herein shown for purposes of illustration, with particular reference to the illustrative embodiment shown in Figs. 1 to 21, the machine comprises an elongated stationary frame structure having upon each side thereof a plurality of winding units arranged in closely spaced relation (Fig. 2) and each comprising a cheese carrier A (Figs. 1 and 12) supporting the cheese c for rotation on a horizontal axis, a yarn traversing and cheese driving drum B (sometimes hereinafter referred to as the "winding drum") also rotating on a horizontal axis and normally supporting a cheese in driving contact with the upper surface of the drum, and a bobbin holder C for supporting active and reserve bobbins in downwardly spaced relation to the cheese. Additionally, each unit includes a yarn clearing device or snick plate D operative upon the running strand to clear or clean the same from gouts or other undesirable particles or enlargements on the yarn, a detector E (Fig. 12) responsive to any interruption in the running strand to stop the winding operation, a second detector F operatively associated with the cheese carrier and adapted to terminate the winding operation upon the attainment by the cheese of a predetermined size, and a reserve thread clamp G operatively associated with the cheese carrier A.

The frame structure comprises a plurality of transverse upright supporting members or legs 10 connected by channel bars 11 extending longitudinally of the machine at opposite sides thereof. On this base structure is supported a plurality of uprights 12 which, in turn, carry an endless track 13 supporting a traveler H which corresponds to the "winder tending mechanism" of said Colman patent and constitutes in its broader aspects the tying unit of the winder.

The traveler H comprises in general a carriage 14 mounted for traveling movement on the track 13 by power derived from an electric motor 15. The frame has at one side a depending portion 16 carrying a knotter I (Fig. 1) and associated devices for finding the exhausted thread and tying it to the reserve thread held by the reserve thread clamp G. The knotter I is of the type shown in Peterson Patent No. 1,657,407, designed for the tying of weavers' knots.

It is the function of the cheese carrier to maintain the cheese in driving contact with the winding drum during the winding operation and to move it into a position for operative association with the traveler when the cheese has reached a predetermined size or upon the interruption of the running strand upon breakage or exhaustion thereof. Having in mind the fact that the improved winder is specially adapted for winding cheeses of large size and therefore of considerable weight, the cheese carrier is specially characterized by its ability to effect the separation of the cheese from the winding drum by a lateral movement in which the cheese moves substantially horizontally outwardly away from the drum, being sustained in its shifted position by means which is rendered ineffective when the cheese is in contact with the drum so as not to interfere with the maintenance of driving contact therewith. Also, it is important that the rotation of the cheese be stopped promptly upon disengagement from the drum. Accordingly, provision is made for interrupting the shifting movement of the carrier in an intermediate or braking position, a position short of its ultimate tying position in which the exhausted thread is found and united to the reserve thread in the operation of the traveler. In the instant embodiment such interruption of the shifting movement of the cheese carrier is utilized to advantage in actuating a brake mechanism for stopping the cheese. Movement of the cheese carrier from braking position to tying position is accomplished by the traveler as will presently appear, and in such movement the brake mechanism is released to permit free rotation of the cheese for end-finding purposes. Following the tying operation the cheese is automatically restored to winding position by the traveler.

In the present instance each cheese carrier comprises a generally upright arm 17, the lower end of which is mounted on a rock shaft 18 supported in brackets 19 on the base frame bar 11. Attached to the upper end of the arm 17 is a bracket 20 in which is mounted a shaft 21 with the opposite protruding ends of the shaft (Fig. 2) carrying a pair of arms 22 and 23 between which the cheese is mounted. Carrier arm 17 is guided against lateral movement by a roller 24 (Figs. 2 and 6) engaging in a groove 25 in the upper end portion of the arm which is generally arcuate in form. Roller 24 is journaled in a bracket 26 attached to a frame bar 27 extending longitudinally of the machine.

Figure 4:
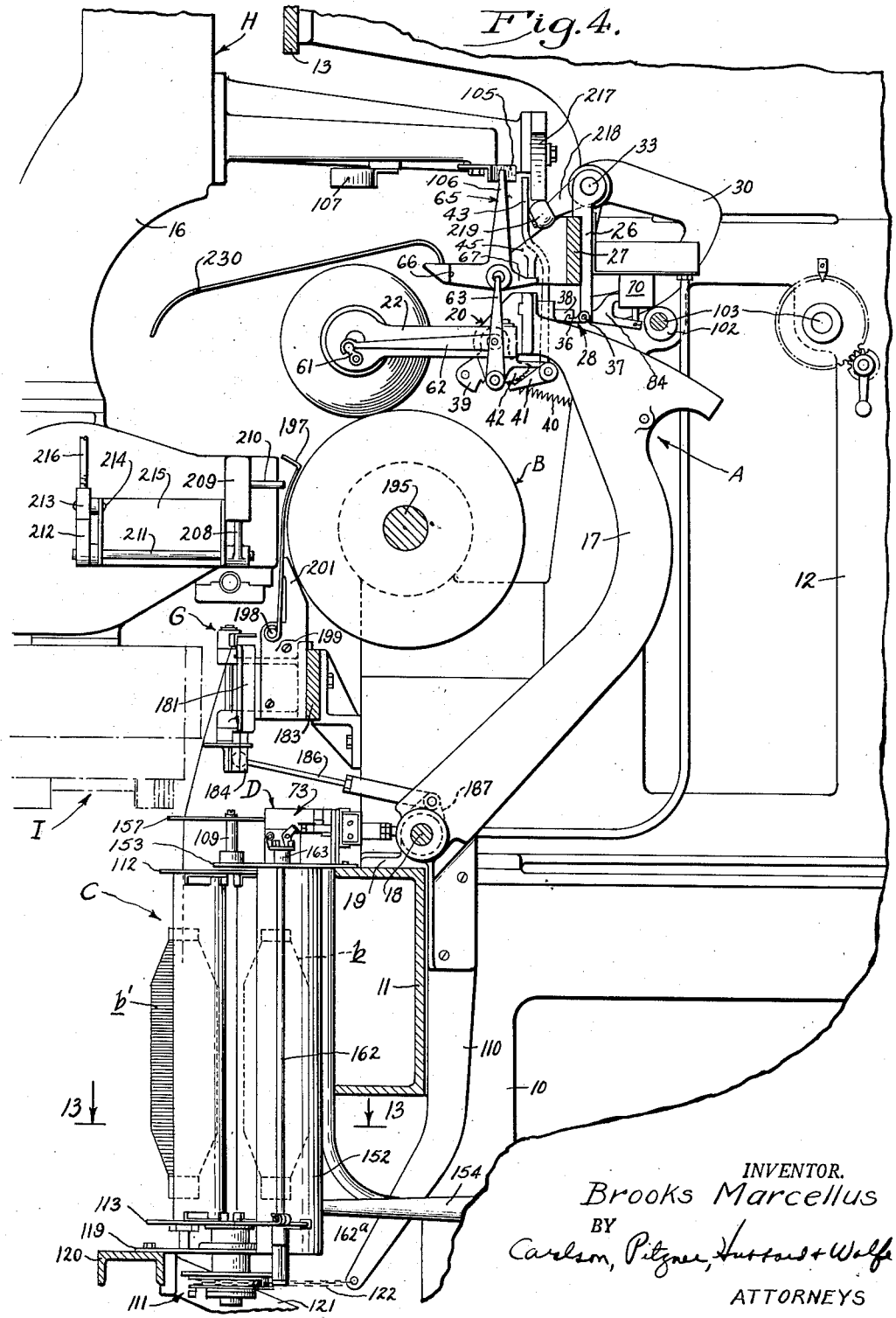
Fig. 4 is a fragmentary vertical sectional view through the left side of the machine as shown in Fig. 1 but on a larger scale, the view being taken substantially on the line 4—4 of Fig. 2.

Movement of the cheese carrier arm 17 is accomplished advantageously through the use of spring means tensioned as an incident to the return of the carrier by the traveler following a tying operation. Thus, the carrier arm is biased for movement in an outward direction, that is to say, in a direction to carry the cheese out of its winding position, but is restrained against movement by a latch device 28 (Figs. 4, 5, and 12). In the present instance the biasing force is derived from a torsion spring 29 (Fig. 2) acting through a segment 30 operatively connected with the upper end of the arm 17 as by means of two metal tapes 31 and 32 (Fig. 5). The segment 30 is mounted on a shaft 33 carried by the upper end of the bracket 26 on the frame bar 27. Spring 29 encircles the shaft and has one end anchored to the machine frame and the other end to a collar 35 adjustably attached to the shaft 33.

The latch device 28 comprises in the present instance a latch member 36 (Fig. 4) pivoted on a pin 37 on the lower end of the bracket 26 and a latch keeper 38 fixed on the arm bracket 20. During the winding operation the latch 36 remains engaged. It is actuated for release of the cheese carrier into braking position in response to the interruption of the active thread or upon the attainment of a predetermined size by the cheese being wound, as will presently appear.

Shaft 21 carrying the cheese holding arms 22 and 23 has fixed thereon a segmental arm 39 (Fig. 5) connected to the cheese carrying arm 17 by a tension spring 40. This spring tends to rock the shaft 21 in a direction to swing the cheese holder arms downwardly so as to exert a downward force on the cheese to maintain it in driving contact with the winding drum B. When, however, the cheese carrier is released for movement by its spring into braking position, the cheese is sustained against downward movement by spring 40 and the force of gravity, by means of a pawl and ratchet device consisting of a pawl 41 pivoted on the bracket 20 and spring pressed toward a toothed segment 42 formed integral with the arm 39. Rigid with the pawl 41 is a vertically elongated finger 43 which engages with a stop 44 on a bracket 45 to hold the pawl disengaged from the segment 42 when the cheese carrier is in winding position. It will be seen that immediately upon movement of the cheese carrier out of such position, the pawl is moved by its spring into holding engagement with the toothed segment so as to sustain the cheese against downward movement (Fig. 6).

For stopping rotation of the cheese upon movement of the cheese carrier into braking position, I provide a brake mechanism of the disk type arranged for actuation at a predetermined point in the outward movement of the cheese carrier arm by its spring 29. In Fig. 8 is shown one end of a cheese core 46 which is disengageably connected to an end plate 47 by interengaging teeth 48 and 49 of the cheese core and end plate, respectively. End plate 47 is grooved to receive a brake ring 50 and a coacting pressure plate 51 equipped with inclined surfaces 52 for coaction with oppositely inclined surfaces on the arms of a spider 53. Pressure plate 51 is held against rotation while permitted to move in an axial direction by pins 54 (Fig. 7). End plate 47 for the core is journaled on the free end of the cheese arm 22 through the medium of a stud 55 fixed on the arm 22 by a nut 56. The arm has a hub portion for receiving the stud as well as the innerrace 57 of a ball bearing, the outer-race 58 of which is mounted in the end plate 47.

The actuating spider 53 is arranged for angular movement by a lever arm 59 fast on a rock shaft 60. To the outer end of the latter is fixed a second arm 61 pivotally joined to the outer end of a link 62 pivotally connected to a brake actuating lever 63 pivoted on the bracket 20 at the upper end of the cheese carrier arm 17.

It will be seen that upon interruption of the movement of the lever 63, as the cheese carrier moves into braking position, the link 62 and crank arm 61 will rock shaft 60 in a direction (clockwise in Fig. 6) to cause the spider 53 to act upon pressure plate 51 to carry it axially into engagement with the brake ring 50 and thereby interrupt rotation of the cheese. Disengagement of the brake upon release of the arm 63 is effected by a spring 64 (Fig. 6) connecting the link 62 with the cheese holder arm 22.

Interruption of the movement of the arm 63 to effect application of the brake during movement of the cheese carrier into braking position is accomplished in the present instance by a stop device in the form of a three-armed lever 65 (Fig. 6) pivoted on bracket 45 on the frame bar 27. One arm of the lever carries a stop lug 66 for engagement by the upper end of the brake actuating lever 63, the latter being spaced from the lug in the winding position of the carrier as shown in Fig. 4. A second arm 67 coacts with a stationary stop 68 on the bracket 45 to position the stop lug 66 in the path of the brake actuating lever 63.

Summarizing, it will be apparent that upon disengagement of the latch 28 the cheese carrier arm 17 is actuated by its spring 29 to shift the cheese being wound out of contact with the drum B, and that in such movement the brake actuating lever 63 strikes the stop lug 66. As a result, the crank arms 61 and 59 are actuated to cause angular movement of the spider in a direction to apply the brake and thus bring the cheese to a stop. The cheese thus remains in braking position (Fig. 6) pending movement into tying position (Fig. 11) under the control of the traveler in a manner subsequently to be described.

Figure 1:
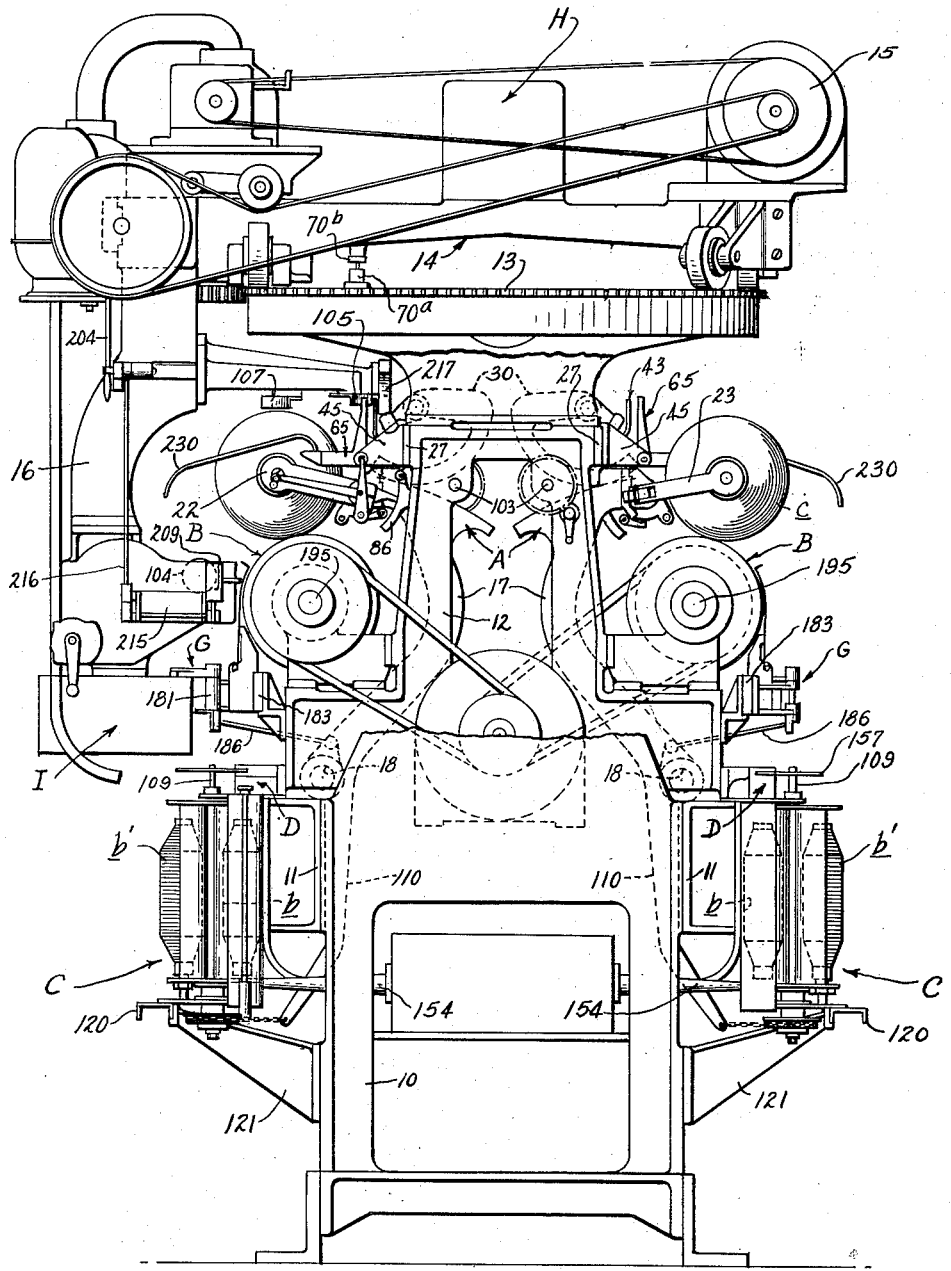
Figure 1 is an end elevation of the new winder.

Disengagement of the latch 28 to release the cheese carrier to the force of its spring 29 occurs in response to the actuation of the detector E (Figs. 12, 13, 15 and 16) upon any interruption of the running strand or in response to the operation of detector F when the cheese has attained its desired predetermined size. In the embodiment shown in Figs. 1 through 20 such disengagement of the latch is accomplished electrically by energization of a solenoid 70 in parallel circuits respectively controlled by a switch 71 (Fig. 12) in the case of detector E and by a switch 72 in the case of detector F and both including a switch 70ᵃ (Fig. 12). There is one switch 70ᵃ for each winding unit mounted on the machine frame as shown in Fig. 1 and adapted to be held open by an elongated cam bar 70ᵇ (Figs. 1 and 21) during the interval when the traveler 11 is disposed opposite the corresponding winding unit. The bar is thus fixed to the traveler frame 16 in a position to engage and open the successive switches 70ᵃ.

Referring first to Figs. 13, 15, and 16, detector E and snick plate D are incorporated in a compact structural unit operatively associated with bobbin holder C. This unit comprises a frame casting 73 in which is rotatably mounted a horizontal rock shaft 74 carrying a blade 75 (Fig. 15) for coaction with an opposed bearing surface 76, the construction and arrangement being substantially the same as that disclosed in Peterson Patent No. 2,202,317. The running strand of yarn passes between the blade 75 and surface 76, a slight clearance being provided therebetween so that any gouts or other undue enlargements on the yarn will be engaged by the blade and thereby cleared from the strand, or the latter broken. At a point below the snick plate the running strand of yarn passes over a stationary guide rod 77 (Fig. 15) carried by the frame casting 73.

In the event that the running strand is interrupted, either by reason of exhaustion of the active bobbin or because of breakage of the strand, the detector E becomes effective to cause actuation of the latch 28 and thereby release of the carrier arm to the force of its spring 29. This detector may be variously located. As shown in Fig. 15, it is disposed between the snick plate and the guide rod 77 and consists simply of a rod 78 rotatably mounted in the frame 73 to one side of the shaft 74 and having an offset crank portion 79 biased toward the running strand. For this purpose the rod 78 has rigid therewith an arm 80 (Fig. 13) having a bent end 81 acting upon a leaf spring 82.

As above indicated, movement of the detector E in response to exhaustion or breakage of the running strand is utilized in the present embodiment shown in Figs. 1 through 20 to actuate an electric control means for operating the latch 28 to effect movement of the cheese carrier A into braking position. For this purpose the spring 82 forms part of the switch 71 which when closed by movement of the detector closes a circuit with the solenoid 70 (Fig. 12). The plunger of the solenoid is connected to an arm 84 rigid with the latch element 36 of the latch 28 so as to cause disengagement of the arm from its keeper 38. Thereupon the cheese carrier is released for actuation by its spring 29 to shift the cheese into the braking position shown in Fig. 6.

Detector F similarly is adapted to disengage the latch 28 by closure of switch 72 controlling energization of solenoid 70. Referring to Figs. 5 and 12, this detector comprises an arm 86 mounted on a pivot 87 on bracket 45 and having a finger 88 operatively associated with the switch 72. Arm 86 is formed with an arcuate follower surface 89 for coaction with an arm 90 fast on the rock shaft 21 which carries the cheese holder arms 22 and 23. Switch 72 is of the well-known overcenter type. It includes an actuator plunger 91 engageable by the finger 88 of arm 86. The curved surface 89 is so shaped that as the cheese holding arms 22 and 23 move upwardly with the increasing size of the cheese, the arm 86 is swung in a switch closing direction.

The point at which the switch 72 is closed by the arm 86 may vary according to the size of the cheese desired. For this purpose the switch is mounted upon a lever 100 (Fig. 11) pivoted at 87. It has a follower 101 for a cam disk 102 fast on a rock shaft 103 extending the full length of the machine and arranged for adjustment in any suitable way. The follower 101 is held in engagement with the cam by a spring 103a (Fig. 11) having one end anchored to the bracket 45 and its other end to the lever 100. By rotating the shaft 103 manually, the point at which the arm 90 actuates the switch 72 through the medium of the arm 86, and therefore the full size of the cheese may be varied at will.

Movement of the cheese from its intermediate or braking position (Fig. 6) into its tying position (Fig. 11) is effected by the traveler H which has an end-finding roll 104 such as that described in the aforesaid Colman patent upon which the cheese rests during the operation of finding the exhausted thread preliminary to tying it to the reserve thread. It will be remembered that the cheese carrier is interrupted in the braking position (Fig. 6) by engagement of lever 63 with the stop lug 66. To effect the advance of the carrier to tying position, it is necessary only to remove the stop 66. This is accomplished by a plow 105 on the traveler (Fig. 11) adapted to engage an upstanding arm 106 on the lever 65 and to swing the latter into the dotted line position shown in said Fig. 11.

As a result of the removal of the stop 66 from the brake lever 63, the cheese brake is released by the action of spring 64 so as to permit free rotaton of the cheese. Also, as the cheese carrier moves outwardly under the action of its spring 29 the pawl 41 continues in engagement with the toothed segment 42 to sustain the weight of the cheese until it can be supported by the end-finding roller 104 of the traveler. Accordingly, provision is made for disengaging the pawl 41 from its segment so that the cheese may come to rest on the end-finding roll. This is accomplished by a second plow 107 on the traveler (Fig. 11) adapted to engage with an upward extension 43a of the finger 43.

The bobbin holder C (Fig. 12) provides a support for an active bobbin b and a reserve bobbin b', and is operatively associated with the cheese carrier A so that as the latter moves into tying position the relative positions of the two bobbins is reversed. That is to say, the active bobbin is moved into reserve position, and the reserve bobbin is moved into active position. At the same time the reserve thread leading from the reserve bobbin to the reserve thread clamp G is carried automatically into operative association with the snick plate D and exhausted thread detector E while the thread clamp G is moved outwardly so as to position the reserve thread in operative relation to the knotter mechanism I of the traveler (Fig. 12a).

Referring now to Figs. 12, 13, 14, 16, and 17, the bobbin holder C is mounted for rotation on a vertical axis defined by a vertical shaft 109 with the two bobbins b and b' disposed on diametrically opposed sides of such axis. Indexing of the bobbin holder through 180 degrees to reverse the relative positions of the bobbins is achieved by a connection between the cheese carrier A and the shaft 109. Such connection comprises in the present instance an arm 110 rigid with and extending downwardly from the cheese carrier arm 17 and having a one-way connection 111 (Fig. 12) with the shaft 109.

As best seen in Fig. 13, the bobbin holder comprises in the present embodiment top and bottom plates 112 and 113 rigid with the shaft 109. The bottom plate 113 is generally circular in form and provides a base or support for two bobbin gripping devices or skewers 114 and 115 disposed in diametrically opposed relation. The plate rests upon the flanged upper end of a cylindrical bearing member 116 secured to a supporting plate 119 which, in turn, is secured to a longitudinal frame channel 120 mounted on bracket arms 121 (Fig. 1) extending outwardly from the frame uprights 10.

The one-way connection 111 between the shaft 109 and the cheese arm comprises a chain 122 having one end connected with the arm 110 and its other end wrapped upon and anchored to a drum 123. Depending from the drum is a pin 124 carrying a pawl 125 (Fig. 13) biased by a spring 126 into engagement with a ratchet disk 127 fixed on the lower end of the shaft 109. The chain drum 123 has a hub portion 128 (Fig. 14) supported in the lower end of the stationary cylindrical bearing member 116 through the medium of a needle bearing 129. The lower end of the shaft 109 is, in turn, supported in the chain drum by a ball bearing 129a.

As shown in Fig. 13 and in broken lines in Fig. 17, the ratchet disk 127 has two diametrically opposed notches 130 for engagement by the pawl 125, the arrangement being such that as the cheese carrier arm 17 is moved into tying position the bobbin holder is indexed through 180 degrees. In the restoring movement of the cheese arm by the traveler (as presently will be described) the chain drum 123 together with its pawl 125 are operated reversely relative to the ratchet disk 127 by a torsion spring 131 (Fig. 14). This spring encircles the shaft 109 and has one end anchored to the bearing member 116 and the other end to the upper end of the hub 128 of the drum so that the spring is tensioned in the indexing movement of the bobbin holder.

Skewers 114 and 115 of the bobbin holder are adapted to support the butt ends of the bobbins b' and b which, in accordance with conventional practice, are bored for the reception of the skewers. These skewers are radially expansible into gripping engagement with the bobbin bores to grip the bobbins and are contractable automatically in the rotation of the bobbin holder to release the bobbins. As shown in Fig. 14 each skewer comprises a base portion 133 rigid with the bottom plate 113 and an upper tubular portion slotted to form spring fingers 135. The upper ends of the latter are inclined outwardly and upwardly for coaction with the head of a plunger 136, the latter having beveled surfaces 137 engageable with the fingers 135 under the force of a compression spring 138 interposed between the base portion 133 and a thrust washer 139 on the lower end of the plunger. Normally, the spring acts upon the plunger to hold the skewer expanded. It is desirable, however, that the bobbin, when in reserve position, be releasably held by the skewer to facilitate removal of the bobbin by the attendant and installation of a new bobbin. Accordingly, provision is made for lifting the plunger 136 against the action of its spring 138 as the skewer moves into reserve position. This is accomplished by the provision of a roller 140 on the stationary supporting plate 119 so positioned that as either skewer moves into reserve position, the lower end of the plunger engages with the roller and is forced upwardly thereby to effect contraction of the skewer.

The bobbin holder is mounted in a stationary housing formed in part by the plate 119 and is so constructed as to coact with the housing in providing a closed pocket or chamber for the active bobbin so as to permit of the effectual withdrawal of dust and lint therefrom by an exhaust system. In the present instance, as shown in Figs. 13 and 17, two arcuate partition plates 150 and 151 are interposed in back-to-back relation between the top and bottom plates 112 and 113 on opposite sides of the shaft 109. To close the bobbin pocket when in active position, the housing has a semi-circular back plate 152 fixed at its lower end to the supporting plate 119 and at its upper end to a stationary top plate 153 supported by the frame rail 11. It will be seen that this construction provides a closed pocket for the active bobbin from which dust and lint may be removed through an air duct 154.

The indexing movement of the bobbin holder B is utilized to advantage in effecting the automatic "threading" or positioning of the reserve thread into operative relation to the snick plate D and detector E while the reserve thread is held in the clamp G and therefore before this thread is tied to the cheese. Preparatory to this threading operation the snick plate and detector are automatically conditioned or "opened" for the reception of the thread, also as an incident to the indexing operation. Moreover, upon the completion of the indexing movement the snick plate and detector are restored to running position or "closed." The threading of the snick plate before, rather than after, the tying operation is important because it insures that substantially all of the yarn will pass through the snick plate for cleaning.

For carrying the reserve thread into running position, the top plate 112 of the bobbin holder is provided with diametrically disposed thread guiding and retaining notches 155 (Fig. 13) positioned centrally of converging guide surfaces 156. An additional thread guide, in the form of a disk 157, is fixed on the upper end of the shaft 109 and having diametrically opposed shoulders 158, the disk 157 being spaced upwardly some distance from the top plate 112. As shown in Fig. 12, the reserve thread s' extends upwardly from the reserve bobbin through the outer one of the guide notches 155 and past the corresponding shoulder 158 to the reserve clamp G. Thus, when the bobbin holder is indexed the reserve thread is carried into engagement with a sloping surface 158a (Figs. 13 and 16) for guidance thereby into running position.

For the purpose of opening and closing the snick plate and the associated detector E, I employ cam means operative in the rotation of the bobbin holder to actuate the rock shaft 74 (Fig. 15) carrying the yarn clearing blade 75, and also the rock shaft 78 of the thread detector E. Thus, the bottom plate 113 of the bobbin holder is made generally circular so as to form a cam having two cam lobes 160 (Fig. 13) coacting with a follower finger 161 fast on a rock shaft 162 which is suitably journaled at its lower end in a support 162a on the machine frame and at its upper end in the stationary top plate 153. At its extreme upper end the rock shaft 162 carries a lever 163 having one arm 164 for coaction with a crank arm 165 fast on the rock shaft 74, and another arm 166 for coaction with the detector rod 78. A spring 167 connected with the lever 163 biases the rock shaft for movement in a direction to hold the cam follower finger 161 against the cam lobes 160.

It will be seen that by the construction and arrangement set forth, an indexing movement imparted to the bobbin holder in timed relation to the movement of the cheese carrier A into tying position imparts rocking motion to the shaft 162 against the action of its spring 167 with the result that rock shaft 74 is turned in a direction (Fig. 15) to separate the yarn clearing blade 75 from its backing surface 76, and the rock shaft 78 is actuated to cause the thread engaging portion 79 of the detector rod to swing upwardly and outwardly away from the path of the running strand. The extent of movement of the blade and detector is sufficient to impart free entry of the reserve thread into active position somewhat before the bobbin holder completes its indexing movement, the reserve thread being guided into such position by the shoulder 158 on disk 157, the notch 155 in plate 112 and by the sloping guide surface 158a, on the stationary frame plate 153.

Upon the completion of the indexing movement of the bobbin holder, the cam follower finger 161 is permitted to move sharply inward by a relatively steep sloping surface 168 at the end of each cam lobe, releasing the rock shaft to the action of its spring 167. Thus, the parts are restored to their normal positions shown in Fig. 15. In this position of the detector E, the lower end portion of the lever 80, which carries a pin 169 for coaction with the actuating arm 166, is spaced from the latter so as to permit free movement of the detector by its leaf spring 82 in response to an interruption in the running strand. Similarly, the yarn clearing blade 75 is yieldably held by a spring 170 (Fig. 16) in spaced relation to the backing surface 76 as determined by a stop pin 171 (Fig. 15) coacting with an arm 172 on the rock shaft 74. The position of the stop pin 171 may be adjusted by a cam 172a fast on a manually adjustable stud 173.

For the purpose of maintaining the bobbin holder stationary during the winding operation, I provide detent means releasable in the initial portion of the indexing movement. As shown in Fig. 13, this means comprises a detent finger 174 engaging in one of two notches 174a in the disk 113. The detent is rigid with the hub 175 of a lever 176 journaled on the lower end of the rock shaft 162. The lever carries a roller 177 which is held by a spring 178 against a cam disk 179 adjustably secured to the chain drum 123. It will be remembered that the bobbin holder is actuated by the chain drum through the medium of a pawl and ratchet device 125, 127. To permit advance withdrawal of the detent 174 by the cam 179, the pawl 125 is withdrawn from the shoulder 130 (Fig. 17) in the return movement of the cheese carrier to provide a lost motion between the pawl and its ratchet disk sufficient to permit movement of the chain drum and, therefore, the cam disk 179 before the ratchet becomes effective to advance the bobbin holder. In such movement the detent finger 174 is released from its notch 174a.

As above indicated, during the winding operation the reserve thread $s'$ leading from the reserve bobbin $b'$ is held in the reserve thread clamp G while the thread from the active bobbin $b$ is being wound on the cheese. Having in mind the continuous patrolling character of the traveler H, it is important that the clamp hold the reserve thread out of the path of the knotter mechanism so that the traveler will by-pass all winding units which are operating as intended and will operate only upon those in which the operation has been interrupted due to the attainment by the cheese of a predetermined size, or to the exhaustion or breakage of the thread, as determined by detector E. Accordingly, the thread clamp of each unit is arranged for outward movement into the path of the traveler in response to the movement of the cheese carrier out of its winding position. For this purpose the thread clamp (Figs. 18 to 20) has a supporting arm 180 constituting in the present instance an extension of one arm of a yoke 181 pivotally mounted on a bracket 182 carried by a longitudinally extending frame bar 183. Rigid with the lower end of the yoke is an arm 184 having a ball and socket connection 185 (Fig. 20) at one end of a link 186, the other end of which is pivotally connected (Fig. 4) to the arm 17 at 187 rigid with the cheese carrier arm 17. The arrangement is such that as the bobbin holder is indexed coincident with the movement of the cheese into tying position and the reserve thread is carried inwardly in such movement of the bobbin holder, the reserve clamp moves outwardly (compare the two positions shown in Fig. 19) so as to position the reserve thread in the path of the knotter in preparation for the operation of uniting this thread with the exhausted thread from the cheese in the operation of the traveler.

The tying operation is performed by the traveler in the manner fully disclosed in said Colman Patent No. 1,267,977, with the exception above noted that the knotter itself is preferably designed for tying so-called weavers' knots as fully disclosed in Peterson Patent No. 1,657,407. In addition to the end-finding roll 104 the traveler includes a suction tube 190 (Fig. 12) and a down-take arm 191 operative to carry the exhausted thread $s^2$ downwardly over a guide rod 192 into operative relation as shown in Fig. 12ª to the tying mechanism 193 herein shown only schematically. To guide the reserve thread in its passage upwardy from the disk 157 of the bobbin holder, the thread clamp G has rigid therewith an arm 194 (Fig. 18) mounted on the arm 184 of the yoke 181 (Fig. 20).

As shown in Fig. 18, the driving and traversing drum B for each unit is mounted on a shaft 195 extending longitudinally of the machine and is provided with a peripheral groove 196 for traversing the running strand. To prevent the operator from accidentally striking the revolving drum when placing the reserve strand in the clamp G, drum guards 197 are provided. Each guard is pivotally supported on a shaft 198 journaled in parallel plates 199 attached to the bracket 182. A torsion spring 200 on the shaft acts upon the guard to hold it yieldably against stops 201 formed on upward extensions of the plates 199. The springs permit swinging movement of the guard away from the drum when access to the latter is necessary, as when removing yarn which may be wound accidentally around the drum. The guards of adjacent units are spaced a short distance apart to permit passage of the running strand therebetween after the tying operation.

While in normal operation the traveler H moves continuously and without interruption about the endless track 13, provision is made for stopping the traveler in the event that a cheese is not properly supported when moved out of contact with the drum, or in the event that a drum guard 197 is displaced outwardly from its normal position. For this purpose the traveler is provided with means for detecting the improper positioning of a cheese or drum guard and operative to disengage the traveler drive mechanism. As shown in Fig. 21, the traveler drive mechanism includes a clutch generally designated at 202, normally held engaged by a latch device 203 acting upon a hand lever 204. The latter is operatively connected with a clutch shifting collar 205 which, in turn, is urged by a spring 206 in a clutch disengaging direction.

The latch device 203 comprises a pivoted latch member 207 normally engaging a lug 204a on the lever 204. Automatic disengagement of the latch 207 when a cheese or drum guard is improperly positioned is effected by a feeler in the form of an arm 208 (Figs. 4 and 21). This arm has a shoe 209 adapted to engage with a misplaced cheese, and a pin 210 extending inwardly from the arm and of a length such as to clear the drum guard when the latter is properly positioned, but to engage the same when out of such position. The feeler arm 208 is fixed on a rock shaft 211 which also carries a segment 212 engaging with one arm of a bell crank 213 pivoted at 214 on a bracket 215. The other arm of the bell crank is connected by a link 216 with the latch member 207. The arrangement is such that movement of the feeler in response to engagement with a misplaced cheese or drum guard disengages the latch member 207 from the clutch shifting lever 204, thereby releasing the lever to the actuation of the clutch spring 206 and causing disengagement of the clutch. The shaft 211 carrying the feeler arm 208 may normally be held against turning by any suitable means such as a yieldable detent (not shown).

For restoring the cheese carrier to running position, a plow 217 (Figs. 5, 6, and 11) mounted on the traveler is adapted to actuate an arm 218 rigid with the segment 30 which, it will be remembered, is operatively connected with the cheese carrier, the arm 218 being provided with a roller 219 for engagement by the plow. The arrangement is such that in the passage of the traveler, the segment 30 is rocked by the plow through the medium of the arm 218 from the position shown in Fig. 11 to that of Fig. 5. As the carrier moves into the latter position the latch 28 is re-engaged to hold the cheese in winding position. At the same time, arm 43 engages with its stop 44 to disengage the sustaining pawl 41 from its toothed segment 42. Preferably, the force of gravity acting to hold the cheese on the drum is augmented by the spring 40 connecting the segment 42 with the carrier arm 17 (Fig. 5).

To permit of the insertion and removal of cheese cores or cheeses, the cheese holder arm 23 is pivoted at 221 (Fig. 2) to the squared end of rock shaft 21. In the normal or lowered position of the arms, as during the winding operation, arm 23 is positively held or locked against outward swinging movement by a roller 222 on an inward extension 223 of the arm engaging with one edge of a member 224 adjustably secured to the bracket 20. However, when the arm is raised a predetermined distance by the attendant, the roller 222 enters a recess 225 (Fig. 3) in the member 224 permitting lateral swinging movement of the arm 23 into the position shown in broken lines in Fig. 2 in the act of inserting or removing a cheese or cheese core.

The manner in which the cheese core is removably supported by the arms 22 and 23 is shown in Figs. 2 and 8. The construction in the case of arm 23 comprises (Fig. 2) a circular plate 226 flanged to interengage with and center the core. The plate has a hub 227 mounted through the medium of a ball bearing 228 on a stud 229 rigid with the arm 23.

It will be apparent from the foregoing that the winding units including the cheese carriers 17 are disposed side by side along the path of the traveler H with the center lines $x$ (see Fig. 34) of the respective units spaced apart uniform distances $p$, 8⅝" in the present instance. Each unit has a full cheese detector F and a thread break detector E which control the release of the cheese carriers to breaking positions so as to cause the traveler H to act selectively when presented to each successive winding unit and either perform an end finding and tying operation or by-pass such unit. The traveler also times each automatic cycle of tying a new thread to a cheese and restarting winding of the latter, the timing being by the cams 105, 107, 217, and 70$^b$ spaced along the traveler as shown in Fig. 34 and coacting with followers 63, 43, 219, and 70$^a$ associated with each winding unit. Other functions of the winding unit are timed by the bobbin holder C whose motion in turn is produced by the cheese carrier arm 17. Because the various operations performed by or on each winding unit are timed by the traveler itself, the cheese and bobbin threads may be found and held in proper association with the knotter I which it operates at $y$ (Fig. 34) to tie the knot as set forth more fully in the aforesaid Peterson patent.

*Operation*

Let it be assumed that the winding drums B are stopped and all of the cheese carriers 17 are advanced to tying position. On each unit the operator places empty cheese cores 46 in position between the cheese holder arms 22 and 23 and places bobbins on the skewers 114 standing in the reserve position. The operator wraps the yarn strand from the reserve bobbin around the core and spins the core by hand until approximately 40 wraps of yarn are wound onto the core. The yarn strand is then broken and the end coming from the reserve bobbin is placed in the thread clamp G.

The cheese core and arm are manually moved back toward the running position, far enough so that the ratchet pawl 125 on the bobbin holder C is in position to engage the ratchet disk 127 on the shaft 109, but not far enough for the cheese arm to be latched in running position. The arm is then allowed to come forward, stopping in the brake position.

The drums B are then started and the traveler H set in motion to tie up all of the cheeses and move them into winding position on the drums. The operator follows along behind the traveler, putting bobbins on the skewers that have been positioned in reserve positions and placing the yarn strand from this reserve bobbin into the thread clamp G.

The operation of the machine may be summarized with particular reference to Fig. 12 showing a winding unit having a running yarn strand $s$ which is being unwound from an active bobbin $b$ onto a cheese $c$ resting upon the driving and traversing drum B, and a reserve thread $s'$ leading from a reserve bobbin $b'$ and held in thread clamp G:

An interruption of the strand $s$ due to breakage thereof or exhaustion of the active bobbin is detected by detector E, while the attainment by the cheese of a predetermined size is detected by full size detector F. In either event, solenoid 70 is energized so as to disengage latch 28 and release the cheese carrier A for movement by its spring 29 into its intermediate or braking position. It is stopped in this position by engagement of brake lever 63 with stop lug 66 on bell crank 65, with the resulting actuation of brake actuating crank arm 61 to stop rotation of the cheese as it moves out of engagement with the drum B. As the cheese moves out of supporting relation to the drum, lever 43 moves away from its stop 44 so that the sustaining pawl 41 becomes effective (Fig. 6) to support the cheese against downward movement by the action of gravity. The cheese carrier normally remains in the braking position awaiting release into tying position by the continuously patrolling traveler H. However, the attendant may, upon observing a cheese in braking position as a result of an interruption of the running strand, choose to tie up the ends manually. In such event, the attendant will, upon completion of the task, restore the cheese carrier manually to running position so as to continue the winding operation without an indexing of the bobbin holder.

As the traveler moves into operative relation to a winding unit whose carrier has been advanced into and permitted to remain in braking position, plow 105 on the traveler actuates bell crank 65 to disengage lug 66 from brake lever 63. The cheese carrier is thus again released for movement by its spring 29 into the tying position of the carrier. Coincidentally with the release of the stop lever 63, the cheese brake is released. Also, the sustaining pawl 41 is disengaged from the toothed segment 42 by engagement of the plow 107 on the traveler with the upward extension 43$a$ of lever 43. Thus the cheese comes to rest upon the end-finding roll 104 of the traveler, for rotation thereby.

As the cheese carrier moves from braking to tying position, the bobbin holder C is indexed through 180 degrees by reason of its connection with the carrier, to reverse the relative positions of the active and reserve bobbins. At the same time disk 157 carries the lower unwound portion of the reserve thread into engagement with the guide surface 158$a$ of the top plate 153 for guidance into running position (Fig. 13).

Preliminary to the movement of the reserve thread into running position, the cam disk 113 of the bobbin holder rocks the vertical shaft 162 (Fig. 13) so that lever 163 at the upper end of the shaft is turned in a direction to actuate rock shafts 74 and 78 through the medium of crank arms 165 and 80, respectively. Thus, the snick plate D and the detector E are opened for the reception of the reserve thread. As the bobbin holder completes its indexing movement, snick plate D and detector E are restored to active positions by a rocking of shaft 162 under control of cam follower 161.

As the reserve thread is moved inwardly in the operation of the bobbin holder into operative relation to the snick plate D and detector E, the reserve clamp G and the thread guide arm 194 are moved outwardly to position the upper end portion of the reserve thread in the path of the traveler for seizure by the knotter I. In the operation of tying such thread to the exhausted thread, the latter is carried downwardly from the cheese on the end-finding roll 104 by the down-take arm 191 of the traveler, the actual knotting operation being in the present instance the same as that disclosed in Peterson Patent 1,657,407.

When the exhausted thread has been united with the reserve thread, the plow 217 on the traveler acts upon lever arm 218 of the segment 30 to restore the cheese carrier to winding position, in which it is held by reengagement of latch 28, as permitted by the deenergized condition of the solenoid 70 whose circuit is interrupted by the switch 70$^a$ which, as described above, is held open by the elongated cam bar 70$^b$ (Figs. 1 and 21) on the traveler. This prevents reenergization of the solenoid and release of the cheese arm before the cheese has attained sufficient speed to tension the strand and cause the detector E to open the switch 71. By the time that the cam bar 70ᵇ passes the switch 70ᵃ allowing the latter to close, the strand will have been tensioned and the traveler passed by the winding unit.

As an incident to return of the cheese carrier to the winding position, the reserve clamp G is drawn by the link 186 (Fig. 12) back to its normal position out of the path of the traveler H.

While the cheese carrier and thread clamp are thus restored, due to the one-way connection 111 between the carrier and the bobbin holder, the latter remains stationary with the previously active bobbin in reserve position. This bobbin is removed by the attendant if the supply of yarn thereon has become exhausted, or if broken, the end of the yarn is found and placed in the reserve clamp G, in which event this bobbin then becomes the reserve bobbin.

Upon release of the cheese carrier from winding position to braking position in response to the attainment of the cheese to the desired predetermined size, the running strand remains unbroken and therefore constitutes an indication to the attendant that the cheese should be removed from the holder arms 22 and 23. In so doing, lever 65 (Figs. 4, 9, and 11) is actuated manually by the attendant to disengage the stop lug 66 from stop lever 63, thereby releasing the cheese carrier for movement into tying position and causing the bobbin holder to be indexed to shift the reserve bobbin b' (Fig. 12) into active position and the partially spent bobbin b into reserve position. Preferably, a rod 230 rigidly attached to the lever 65 extends outwardly therefrom at one side of the cheese in convenient reach of the attendant.

Before removing the fully wound cheese the attendant first breaks the strand leading to bobbin b now in reserve position, removes from the clamp G the thread of the bobbin b in active position and substitutes in this clamp the thread from the bobbin b' in the reserve position thus conditioning this thread for tying by the traveler knotter. After replacing the cheese with a new core having a small quantity of yarn wound thereon, the cheese carrier is restored to the braking position thus preparing the winding unit for an automatic tying operation the same as the operation following an actual break in the running thread.

From the foregoing, it will be seen that the tying unit is rendered active to substitute a new bobbin and tie the thread thereof to the package being wound whenever a winding unit having a broken or exhausted thread, as determined by the action of its thread detector, is brought into operative association with the tying unit as a result of the relative traveling movement between the two units. Thus, the package or cheese is presented to the end finding roll, the found thread and the reserve thread are presented to the knotter, the two are united, the exhausted or broken bobbin is removed from the holder and the reserve bobbin is substituted therefor, and the thread detector is rethreaded with the new thread.

On the other hand, if thread extending between the bobbin and the package of any winding unit remains unbroken as the unit is brought into operative association with the tying mechanism, this unit will be by-passed and none of the finding, tying, and thread substituting operations will be performed on this winding unit. Such by-passing is due to the fact that, at the time of operative association of the winding and tying units, the thread detector of the former senses the presence of the unbroken thread and holds the associated control elements inactive as the two units pass each other in their relative traveling movement.

Such by-passing is possible in the present machine by locating out of the path of the traveling tying mechanism those parts of each winding unit which would otherwise offer interference. Thus, as shown in Fig. 4, the winding drum, the cheese being wound, the reserve bobbin, and the reserve thread are spaced inwardly from the opposed parts of the tying mechanism. Also, the plow 107 is separated from the arm 43, and the cam 217 is adapted to pass idly over the follower 219 of the carrier restoring lever 30. The plow 105, by which the tying mechanism is activated in the absence of an unbroken thread, does engage the arm 106 of the carrier release latch 65 but, since the latter is not active, its movement by the passing plow 105 is merely an idle one.

*Modified construction*

Figs. 22 to 34 illustrate a modified and preferred form of the invention, including a mechanical, rather than an electrical, form of control for the cheese carrier. Moreover, in order to greatly simplify the procedure of reconditioning each winding unit after the cheese thereof has been filled, provision is made for release of the cheese carrier to braking position under the direct control of a detector responsive not only to the exhaustion or breakage of the strand but also to a forced breakage of the running strand rendered active by a modified form of the full size detector.

As shown in Fig. 23, the running strand in its passage upwardly from the active bobbin to the cheese passes first through a normally ineffective clamp device J then into engagement with a tensioning device K just preceding passage through the snick plate D. Above the snick plate the strand engages with a detector E' which is substantially similar to the detector E previously described. In this instance it comprises a rod 231 journaled in the frame and having an upwardly offset thread engaging portion 232 (Figs. 23, 25, 26). A crank arm 233 on the rod 231 is acted upon by a spring 234 to hold the portion 232 yieldably against the strand immediately below the disk 157 at the upper end of the bobbin holder. On the side of the strand opposite the offset portion 232 is a stationary yarn guide 235 (Fig. 23).

The tensioning device K comprises a rod 236 (Figs. 23 and 24) journaled in the frame and having an upwardly offset portion 237 coacting with a stationary guide rod 237ᵃ. The portion 237 is yieldably held against the strand by a spring 238 (Fig. 26) through the medium of a crank arm 239 fast on the rod 236. The degree of tension imposed upon the strand is desirably made variable according to the size and type of yarn being operated upon. For this purpose the position of the offset portion 237 relative to the stationary guide 237ᵃ, and therefore the arc of contact, is made adjustable. In the present instance the arm 239 has a finger 240 (Fig. 26) engaging with the edge of a cam disk (Fig. 24) which may be set at various positions as determined by an appropriate scale, the finger being held against the cam disk by the spring 238.

Opening of the snick plate D, the detector E', and also the tensioning device K is accomplished as an incident to the indexing of the bobbin holder substantially as in the previous embodiment. The rock shaft 74 of the snick plate D has a crank arm 165' (Figs. 25 and 26) equipped with an opening lug 242, the crank arm 233 of the detector E' has an opening lug 244, and the crank arm 239 of tensioning device K has an opening lug 245. For coaction with the respective lugs 242, 244, and 245, the upper end of the vertical shaft 162 which is rocked as above described by one cam 160 in the indexing of the bobbin holder, has an arm 163' equipped with three lugs 242ᵃ, 244ᵃ, and 245ᵃ which engage and move the lugs 242, 244, and 245 so as to rock the arms 165', 233, and 239 thus separating the coacting parts of the snick plate, the detector E', and the tensioning device K so that the reserve thread may, as the bobbin holder completes its half revolution be directed into tying position by the guides 158ᵃ and 235 (Fig. 25).

As above indicated, the device J operates to force a break in the active thread when the cheese has attained its predetermined full size, and upon such severance of the thread, the cheese carrier is released for movement into braking position directly under the control of the detector E' the same as in the case of any other break of the strand. In the present instance, the breaking device comprises a movable clamp member 250 (Fig. 25) in the form of a bell crank pivoted at 251 on the stationary top plate 153 of the bobbin holder C. This top plate, as in the previously described embodiment, is notched to provide the thread guiding edge 158ª and the clamp member is provided with an edge 252 which coacts with an extension of the stationary edge 158ª adjacent the bottom of the notch to form the other member of the clamp. The clamp member 250 is normally held by a detent 253 (Figs. 25 and 26) against movement by a spring 254 with the edge 252 spaced from the edge 158ª as shown in Fig. 25, this being the normal or inactive position of the clamp.

Disengagement of the detent from the movable clamp member is effected by a full size detector F' (Fig. 27) when the cheese being wound has reached its predetermined full size. This detector comprises in the instant embodiment a lever 255 pivoted at 255ª and arranged for actuation by an arm 90' (Figs. 22 and 27) which, as in the previously described embodiment, is rigid with the rock shaft 21 carrying the cheese holder arms 22 and 23. Arm 90' has a finger 256 for engagement with the upper edge of the lever 255.

Movement of the lever 255 by the arm 90' as the latter is lowered with the growth of the cheese to its full size is transmitted directly to the detent 253 through a linkage consisting of a vertical rod 256ª attached to the lever, a bell crank 257 (Fig. 28) and a longitudinally adjustable rod 258 pivotally connected to the detent, the latter being in the form of a bell crank mounted on a fixed pivot 259 and urged toward active position by virtue of the attachment of the spring 254 to the rod 258 as shown in Fig. 25.

Referring again to Fig. 27, the pivotal support for the lever 255 is made adjustable so that the point at which the detent 253 is withdrawn to release the clamp member may be varied as is determined by the size of the cheese to be wound. For this purpose the pivot 255ª for the lever is carried by the lower end of a bar 260 suitably guided for vertical movement and connected at its upper end with an arm 261 fast on a rotationally adjustable shaft 262. This shaft extends lengthwise of the machine and is common to all of the winding units on one side of the machine. It will be understood that upon upward clockwise rocking of the detent 253 as viewed in Figs. 26 and 28, the clamp 252 is swung to the right as viewed in Fig. 25 thereby moving slightly past the stationary clamping edge 158ª to pinch and hold the strand thus forcing breakage of the latter. The bobbin end of the strand remains held in the clamp J.

As shown in Fig. 22, the arrangement of the cheese holder arms 22' and 23' is reversed as compared to that of the previous embodiment, merely for purposes of design. Thus, arm 22' carrying feeler arm 90' of the full size detector is at the left as viewed from the front of the machine, and the arm 23' is at the right. The latter has a rear extension 223' with a roller 222' coacting with a recessed cam plate 224'. Finger 256 of feeler arm 90' is in the form of a yoke having a free end portion or leg coacting with the upper edge of feeler lever 255.

The detector E' is responsive to the interruption of the running strand caused either by breakage or exhaustion thereof or because of severance by the clamp device J. In the present embodiment of the invention, movement of the detector feeler 232 initiates disengagement of a latch means 28' (Fig. 27) by direct mechanical action instead of by a solenoid. This latch means comprises an element 36' fulcrumed on a fixed pivot 36ª and biased by spring 262ª for movement into engagement with a keeper 38' rigid with the cheese carrier head 20.

For initiating disengagement of the latch 28' (Fig. 27) mechanically, the crank arm 233 of detector E' (Figs. 25 and 26) has a stop finger 263 movable upwardly upon interruption of the running strand into blocking relation to a longitudinally adjustable feeler rod 264 of a constantly operated floating lever mechanism 265. As shown in Fig. 28, the rod 264 is connected to one arm of the bell crank lever 266 pivoted on an oscillating bracket 267 clamped on a rock shaft 268 which is oscillated back and forth by a motor driven eccentric 269 connected by a link 270 to an arm 271 on the rock shaft. The other arm of the bell crank is connected by a vertical link 272 with the latch element 36' of the cheese carrier latch means 28'.

When, in response to the interruption of a running strand, detector E' is actuated to carry stop finger 263 upwardly into blocking relation to the feeler rod 264, bell crank 266 is rocked in a direction to exert a downward pull on link 272 so as to effect withdrawal of latch element 36', thereby releasing the cheese carrier for movement into braking position. Movement of the cheese carrier is accomplished by the spring 29 acting upon the segment 30 just as in the previous embodiment. In this instance, however, the operative connection between the segment and the cheese carrier arm 17 is formed by intermeshing spur gear teeth 31' and 32' instead of by means of steel tapes. As before, the cheese carrier is stopped in braking position by engagement of the brake lever 63 with a stop lug 66' on a lever 65'.

Movement of the cheese carrier from braking to tying position under the control of the traveler plow 105, coupled with outward movement of the reserve thread clamp and indexing of the bobbin holder C to carry the reserve bobbin into tying position, follows in the manner set forth in connection with the previously described embodiment. Thus, the plow 105 of the traveler acts upon lever 65' to disengage its lug 66' from the brake lever 63 and thereby allow the cheese carrier to advance to tying position.

Upon restoration of the cheese carrier to its winding position by the traveler plow 217 acting upon arm 218 of segment 30, the latch element 36' is re-engaged with its keeper element 38' by the spring 262ª (Fig. 27). At the same time the spring 262ª acts to restore the floating lever 266 to its normal position preparatory to the next latch-disengaging operation.

The indexing movement of the bobbin holder is utilized to effect a resetting of the clamping device J. For this purpose, the vertical shaft 109 of the bobbin holder is provided with a double lobed cam 273 (Figs. 25 and 26) engageable with an arm 274 on the clamp member 250 projecting outwardly from the pivot 251 thereof. In each indexing operation one of the cam lobes engages the arm 274 so as to swing the clamp member counterclockwise against the action of its spring 254 to an extent sufficient to permit the clamp dog 253 to be moved by the spring 254 into blocking relation to the clamp member.

The means for sustaining the cheese when not resting upon the winding and traversing drum or upon the end-finding roll of the traveler is substantially the same as in the previous embodiment, the difference being in specific design only. As shown in Fig. 27, this sustaining means comprises a pawl 41' mounted on an arm 276 projecting forwardly from the lower end of a lever 43' pivotally mounted on the cheese carrier 17, the intermediate portion of the lever being broken away in Fig. 27 to expose other parts. Near its upper end the lever 43' engages with an adjustable stop screw 44' so that in the winding position of the carrier, the pawl is held as shown in Fig. 27 out of engagement with the toothed segment 42' and against the action of its biasing spring, the extreme upper end of the lever 43' being positioned for coaction with the traveler plow 107 in the tying position of the cheese carrier as in the previous embodiment.

The toothed segment 42' also differs specifically from that of the previous embodiment in that it is mounted for turning movement on the shaft 21 but is secured against movement in adjusted position by means of an arm 277 fast on the shaft 21 and connected with the segment by an adjusting screw 278 and locking screw 278ª.

The arrangement above described for utilizing the full cheese signal as evidenced by upward movement of the rod 256ª (Fig. 28) for rendering the clamp J active is preferably modified so as to perform two additional functions. One of these is to give a visual signal by which the machine attendant may readily distinguish a full cheese on a carrier released to braking position as contrasted with a partially filled cheese moved to braking position in response to a broken thread or running out of a bobbin. Secondly, it is desirable, as described above in connection with the electrical control system, to maintain the thread break detector E' disabled until the new thread tied to the cheese by the traveler action has become tensioned sufficiently to prevent the cheese from being released from winding position by immediate action of the detector E' after the cheese has been returned to this position following tying of the thread.

Figs. 29 to 32 illustrate a typical construction for performing these additional functions. In this instance, the movable clamp member 252 (Fig. 32) is disposed below the coacting stationary edge 158ª so as to effect a sharper snubbing (Fig. 31) of the strand to be broken or held. As before, the clamp is on bell crank 250 which has an extension 250ª (Fig. 30) urged by the spring 254 in the clamp applying direction and is normally blocked in unclamped position as shown in Fig. 32 by the end 253ª of a bell crank detent lever 253 pivoted at 259. In the present instance, the detent is biased downwardly by a spring 301 (Fig. 31) acting on an upstanding arm 302 having a pin and slot connection 303 with a rod 304 which extends rearwardly and is joined at its rear end to the upstanding arm of a bell crank 305 loose on a shaft 306 and having a horizontally and rearwardly projecting arm. The latter carries a surface 307 which underlies the end of an arm 308 of the floating bell crank lever 266 pivotally supported on the continuously oscillating bracket 267 above described. The rod 264, which extends forwardly to the thread detector E', is as before, attached to a depending arm on the lever 266, so as to reciprocate back and forth. When it is blocked by the lug 263 (Figs. 26 and 28) in response to the sensing of a thread interruption by the detector E', the bell crank 266 will, on the next forward stroke of the rocker 267, turn clockwise thus pulling the rod 256ª downwardly to trip the latch 36' to release the cheese carrier as described above for movement to braking position. This downward motion of the lever arm 308 also depresses the horizontal arm of the bell crank 305 thus pulling the rod 304 rearwardly to tilt the bell crank 253 to the position shown in Fig. 31. The detent 253ª is thus raised releasing the clamp arm 250 for movement by its spring 254 to clamped position past the edge 158ª (Fig. 31) thus gripping the loose bobbin end of the thread.

The clamp remains closed as in the forms described above until the cheese carrier is released for movement to tying position which is accompanied by turning of the bobbin holder C to carry the reserve thread into the then open detector E', the snick plate, and the tensioning device D. In the initial part of this movement of the holder, the cam 273 (Figs. 25 and 30) engages the arm 274 and swings the clamp member 250 counterclockwise until its arm 250ª passes the detent 253ª which is thus reset as shown in Fig. 32 by the action of the spring 301.

In the movement of the bobbin holder to place the reserve bobbin in tying position, the cam 160 (Fig. 13) operates as previously described to rock the shaft 162 and swing the arm 163' (Figs. 25 and 26) to open the detector E', the snick plate D, and the tension device J while the reserve thread is being carried along the guide 158ª and 235 into winding position. The arm 163' is allowed to swing reversely under the action of the spring 167' as the bobbin holder completes its movement and the follower 161 passes the cam fall 168. The thread detector, the snick plate, and the tension device are thus released for movement to active positions. Provision is made, however, for preventing activation of the thread detector at this time by a supplemental mechanism now to be described.

In the advance of the cheese arm 17 from winding position to braking position following release of the latch 36', an adjustable button 310 (Fig. 29) on the arm approaches the rear end of a horizontal rod 311 which is slidable in guides 312 on the machine frame and at its forward end is fixed to the lower end of an upright arm 313 to which the reserve thread clamp G is attached at its upper end. The mounting of the clamp G thus differs from the swingable mounting previously described. When, by the action of the traveler cam 105, the brake trip arm 63 is released as above described to permit the carrier arm 17 to move forwardly to tying position, the rod 311 is pushed forwardly to advance the clamp G and the reserve thread to tying position and also to present a notch 311ª in the side of the rod to a latch 317 (Figs. 29 and 34) pivoted at 314 and weighted at its lower end so as to be urged into the notch and thereby latch the rod against retraction by a spring 315 (Fig. 29) acting on a bar 316 attached to the lower end of the clamp arm 313. The cheese carrier becomes latched and remains in winding position because the detector E' is being held inactive and the rod 264 is no longer blocked by the lug 263 (Fig. 26).

In the advance of the rod 311 to move the reserve thread into operative association with the knotter of the traveler, the bar 316 swings a lever 318 (Fig. 29) clockwise about its pivot 319 on a frame 322 to the position shown in Fig. 33. In this movement, a hook 320 on the lower end of the lever moves toward the feeler 232 of the detector E' which has been or is being swung rearwardly and to the left as viewed in Fig. 33 to open position by the action of the cam 160 in rocking the arm 163' (Fig. 26). In this respect, the hook 320 holds the thread detector E' open and such disabling of the detector is prolonged beyond the time when the detector would otherwise be rendered active by the arm 163'.

After the allowance of a short interval in which the cheese attains sufficient speed to tension the thread, a cam 321 (Fig. 29) spaced along the traveler from the knotter as shown in Fig. 34 engages the upper end of the latch 317 thereby swinging the lower end out of the notch 312. The spring 315 then retracts the thread clamp G and rocks the lever 318 to release the feeler 232 to the action of its spring 234 thereby rendering the detector E' again operative.

In response to the attainment of a full cheese as evidenced by upward movement of the rod 256ª as described above, the clamp 250 is rendered active by a mechanism separate from the bell crank 302 so that the visual signal above referred to may be given. For this purpose, an arm 330 (Figs. 30 and 31) upstanding from a pivot 331 on the subframe 322 is formed at its upper end with a flag 333 which is normally retracted out of view behind the front edge 334 of a wall of the frame (Fig. 30) but becomes visible when rocked forwardly as shown in Figs. 30 and 31. The arm 330 is biased clockwise by a spring 334ª but is normally blocked as shown in Fig. 32 by the end of a rod 335 guided at 335ª and overlying the end of a lug 336 projecting rearwardly and horizontally from the arm 330. When the rod 335 is retracted to the left, the arm swings from the position shown in Fig. 32 to that of Fig. 31 thus moving the flag 333 in to view. This constitutes a signal that the cheese is full and that it should be removed from the machine and replaced by a new core.

The other end of the horizontal rod 335 is attached to the depending arm of a bell crank 337 having a horizontal arm connected to the lower end of the rod 256ª which, as described above, is moved upwardly when the cheese becomes full. As a result, the rod is retracted beyond the lug 336 whereupon the lever 330 is rocked by its spring to the position shown in Fig. 31. In this movement, the lug 336 on the flag arm engages a horizontally projecting lug 338 on the clamp release detent 302 which is thereby rocked counterclockwise as permitted by the lost motion 303. Such independent raising of the detent 253 releases the clamp member 250 for movement to the clamped position (Fig. 31) and the resulting gripping of the running thread causes breakage of the latter. Thereupon, the detector E' senses this forced interruption of the thread thereby initiating removal of the cheese from engagement with the winding drum and the other operations above described that follow the detection of an ordinary thread break or running out of a bobbin. It will be observed, however, that the flag 333 is moved into view only in response to the attainment of full size of the cheese. Thus the machine distinguishes automatically between the several different kinds of thread breaks and indicates to the operator which one requires his attention.

Restoration of the flag 333 to inactive position out of the view of the operator may be effected automatically along with the resetting of the clamp 250. To this end, a lug 340 projects downwardly from the bottom of the flag arm 330 into the path of the extension 250ᵃ of the clamp lever 250 when the latter is being reset as above described during the turning of the bobbin holder C.

Under one condition in the operation of the machine above described, there is a possibility of giving a false indication of a full cheese and in response thereto releasing the cheese carrier to braking position thereby interrupting the winding of a particular cheese. This condition develops when there is a thread interruption when the cheese is nearly filled but nevertheless not large enough to give the full cheese signal and move the rod 335 in the regular way above described. As a result of such a thread interruption, the cheese carrier is advanced and a thread is tied on in the regular way. As an incident to this, the cheese when its weight is transferred from the thread finding rolls 104 back to the pawl and ratchet 41' and 42' (Fig. 27) on the carrier 17, is raised slightly above the position it occupied when leaving the winding drum B following the thread interruption. As a result, the cheese may, when it is returned to its winding position, depress the arm 255 and initiate upward movement of the rod 256ᵃ which constitutes the full cheese signal.

To disable the rod 256ᵃ and prevent such a false signal from releasing the latch 36' and interrupting the winding of the cheese, provision is made for holding the arm 330 in the position shown in Fig. 32 while the rod 335 is being held retracted by the false full cheese signal. The detector disabling lever 318 above described affords a convenient means for performing this additional disabling function. Accordingly, this lever is provided with a second arm 342 (Figs. 30 and 33) having a hook 343 which in the normal position of the lever (Fig. 31) is raised above and out of the path of a lug 344 projecting laterally from the flag lever 333. However, when the lever 318 is disposed in its actuated position shown in Fig. 32, which is the case while the cheese is being returned to the winding drum and until it gets up to speed as determined by the action of the cam 321 on the latch 317 (Figs. 29 and 34), the shoulder of the hook 343 will move to a position to block the lug 344 on the arm 330. This prevents clockwise swinging of the lever 330 by its spring 334 in the event that a false full cheese signal is given. When this signal is given in the regular way the hook will be raised away from the lug 344 so that the various mechanisms operate as previously described to shift the full cheese to braking position.

With the electrically controlled version of the machine shown in Figs. 1 to 25, the disabling of the detector E' until the thread has been tensioned properly following return of the cheese to winding position may be accomplished by the addition of a clamp device J as above described to force a break in the running strand following a full cheese signal and by utilizing a solenoid 346 (Fig. 35) to raise the latch dog 253 of this clamp device and effect the release of the clamp member 250 and the forcing of a thread break following the detection of a full cheese and the resultant closure of the switch 72. To this end, the armature of the solenoid is connected directly to the dog and the winding 347 thereof is interposed in series with the solenoid 70 as shown in Fig. 12. As a result, the solenoid 346 will be energized simultaneously with the solenoid 70 by which the cheese carrier is released for movement to braking position following the attainment of a full cheese. As in the case of the solenoid 70, the solenoid 346 becomes deenergized and is held deenergized by the normally closed switch 70ᵃ which is held open until the traveler has passed the winding unit and at least sufficient time has been allowed for the attainment of the desired winding speed by the cheese. This precludes the possibility of reenergizing the solenoid 346 until the newly tied thread has been tensioned properly so that the detector E' may operate in the intended manner. Conditioning of the circuit for energization of the solenoid 346 as well as the cheese carrier release solenoid takes place when the cam bar 70ᵇ on the traveler A passes the switch 70ᵃ and allows the latter to again close.

Except for the additional functions performed and the manner of utilizing the full cheese signal, the operation of the preferred form of spooler is essentially the same as that described in connection with the first described form of the machine. In the case of a full cheese, this condition is indicated visually by the appearance of the flag 333 whose actuation takes place selectively in response to a forced breaking of the running strand as contrasted with an ordinary break or a running out of the bobbin. When the attendant sees the flag of one of the winding units, he removes the cheese, substitutes a new core leaving the carrier advanced in the intermediate position. All special thread handling operations are avoided. It will be apparent that by utilizing the various thread feelers to govern the selective action of the traveler H on the successive units, it is possible to maintain each of the winding units in operation a substantially greater proportion of the time than is possible with prior spooler constructions. That is to say, the traveler patrols the row of winding units continuously and operates selectively on those which are out of operation. As a result, the delay in getting each winding unit back into operation following filling of the cheese or interruption or running out of the thread is reduced greatly as compared to prior machines. All that is required of the attendant in addition to removing the full cheeses and substituting empty cores is to select the winding units that are stopped and out of operation, find the loose end of a partially filled bobbin or replace the empty bobbins in the conveniently accessible pockets, and lead the thread from such bobbins into the corresponding thread clamp G. All of the other functions for getting each winding unit back into operation are performed entirely automatically including the selection of the idle units.

For the sake of brevity, in the appended claims the word "bobbin" is used to denote in a general sense a yarn supply package, and the word "cheese," the yarn mass or package formed or to be formed in the winding operation.

This is a continuation-in-part of my application Serial No. 319,640, filed November 10, 1952, now abandoned.

I claim as my invention:

1. A winder comprising, in combination, a winding unit and a tying unit arranged for relative traveling movement in a fixed path, said winding unit having means for supporting and driving a cheese in a winding position, a movable carrier for the cheese, means for supporting a bobbin with a running strand extending between it and the cheese, a movable support for a reserve bobbin, a reserve thread holder for a strand leading from said reserve bobbin, means responsive to an interruption of the running strand to effect a shifting of the carrier from said winding position to an inactive position, means operative in the relative traveling movement of the winding and tying units when said carrier is in said inactive position to shift the carrier from its inactive position and position the cheese into operative association with the tying unit, said shifting means remaining inactive when the carrier is in said winding position during movement of the winding and tying units past each other, and means operative in the movement of said carrier into tying position to actuate said reserve thread holder to position the reserve thread in operative relation to the tying unit.

2. A winder comprising, in combination, a series of winding units and a tying unit arranged for relative traveling movement in a fixed path, said tying unit including a knotter and each of said winding units having a carrier for moving a cheese from an active position to a tying position, a movable support for a reserve supply package, a holder for a strand leading to said reserve bobbin, and means operative as an incident to the movement of the carrier into tying position to move said reserve bobbin into running position and to shift said reserve thread holder relative to said bobbin support to position the thread held thereby in operative relation to the knotter of the tying unit.

3. A winder comprising, in combination, a winding unit having a cheese carrier movable to shift the cheese from a winding position to a tying position, a movable bobbin holder for supporting active and reserve bobbins, a holder for the end of a strand leading to the reserve bobbin, said holder being movable relative to said bobbin holder, a yarn clearing device, means operative in timed relation to the shifting movement of the cheese carrier to move said bobbin holder and carry the active bobbin out of running position and the reserve bobbin into running position, and means operative as an incident to the movement of the reserve bobbin into running position to move said thread holder and position the reserve thread relative to said clearing device.

4. A winder comprising, in combination, a tying unit and a winding unit arranged for relative traveling movement, said tying unit having a knotter and said winding unit having a carrier for cheese to be wound, operative to shift the cheese from a winding to a tying position in operative relation to the knotter, a reserve thread clamp, a bobbin holder rotatable on a fixed axis and adapted to support active and reserve bobbins disposed on opposite sides of said axis and respectively having strands leading to the cheese and to the reserve clamp, a device for operating upon the strand extending from the active bobbin to the cheese and comprising relatively shiftable members between which the strands pass, means operable in the movement of the cheese carrier into tying position to impart an indexing movement to the bobbin holder to reverse the relative positions of the active and reserve bobbins, means operating in such movement of the bobbin holder to separate said members and to carry the reserve thread into position therebetween, and means operable in the movement of the carrier to shift said reserve thread clamp and the reserve thread held thereby into operative relation to the tying unit.

5. A winder comprising, in combination, a tying unit and a winding unit, said tying unit having a knotter and said winding unit having a carrier for a cheese to be wound operative to shift the cheese from a winding position to a tying position in operative relation to the knotter, a reserve thread clamp, a rotatable bobbin holder for active and reserve bobbins disposed on opposite sides of the holder axis and having active and reserve threads leading to the cheese and to the reserve clamp respectively, a yarn clearing device comprising relatively movable members between which the active strand passes, means operable in the movement of the cheese carrier toward tying position to impart an indexing movement to the bobbin holder to reverse the relative positions of the active and reserve bobbins, means operative in timed relation to such indexing movement first to separate the said two members of the clearing device and then to restore them to normal relationship, and means movable with the bobbin holder in its indexing movement to carry the reserve thread into position between the two members of the clearing device while in separated relationship, said carrier also having a connection with the reserve clamp for carrying the reserve thread into operative relation to the knotter as the reserve bobbin is moved into active position.

6. In a winding machine, a rotatably mounted holder for active and reserve bobbins, a device for operating upon a running strand extending from the active bobbin to a package being wound, said device comprising relatively movable members normally urged toward each other but separable to permit sidewise entry of a thread therebetween, means for holding a thread leading from the reserve bobbin, and means operative in the rotation of the bobbin holder to separate said members, to carry the reserve thread into position therebetween, and then release the members for movement toward each other.

7. A winder comprising, in combination, a tying unit and a winding unit, said tying unit having a knotter and said winding unit having a carrier for a cheese to be wound operative to shift the cheese from a winding position to a tying position in operative relation to the knotter, a reserve thread clamp, a rotatable bobbin holder for active and reserve bobbins disposed on opposite sides of the holder axis and having active and reserve threads leading to the cheese and to the reserve clamp respectively, detent means for locking the bobbin holder against rotation, and means operable in the movement of the cheese carrier toward tying position, first to disengage said detent means and then to impart an indexing movement to the bobbin holder to reverse the relative positions of the active and reserve bobbins.

8. In a winding machine, a bobbin holder mounted for rotation on a fixed axis and adapted to support two active and reserve bobbins on opposite sides of said axis, detent means for holding the bobbin holder against rotation, and actuating means operative first to disengage said detent means and then to impart an indexing movement to the holder to reverse the relative positions of the active and reserve bobbins.

9. In a bobbin winding machine, a rotatable holder for active and reserve bobbins, a reciprocatory actuator having a pawl and ratchet connection with said holder comprising a ratchet disk rigid with the holder, a drum operatively connected with the actuator and carrying a pawl engageable with the ratchet disk, detent means operative to lock the holder in its indexing position, and spring means energized in the movement of the drum by the actuator as the latter moves in one direction to impart a return movement to the drum as the actuator moves in the opposite direction.

10. A winder comprising, a tying unit and a winding unit, said tying unit having a knotter and said winding unit having a carrier for a cheese to be wound operative to shift the cheese from a winding position to a tying position adjacent said knotter, a reserve thread clamp, a rotatable bobbin holder for active and reserve bobbins disposed on opposite sides of the holder axis and having active and reserve strands leading to the cheese and to the reserve clamp, respectively, said bobbin holder having skewers with means normally effective to grip the bobbins thereon, means operable in the movement of the cheese carrier into tying position to impart an indexing movement to the bobbin holder and reverse the relative positions of the active and reserve bobbins, and means operable as an incident to the movement of a bobbin into reserve position to actuate said gripping means so as to effect release of the bobbin.

11. In a winder having a cheese driving and traversing drum supported for rotation on a horizontal axis, a cheese carrier comprising a support mounted for movement in a direction transversely of the drum, and cheese holding means mounted on said support for movement relative thereto as an incident to the growth of the cheese being wound, said support being movable to shift the cheese substantially horizontally to carry it out of contact with the drum, and means operative automatically in such movement to sustain the cheese holding means against downward movement when out of contact with the drum comprising a ratchet member rigid with the cheese holding means, a pawl on said support biased for movement into engagement with the ratchet member, and means operative in the winding position of the cheese on the drum to hold said pawl disengaged from the ratchet member.

12. In a winder having a cheese driving and traversing drum supported for rotation on a horizontal axis, a cheese carrier comprising a support mounted for movement in a direction transversely of the drum and cheese holder means including an arm pivotally mounted on said support for movement relative thereto as an incident to the growth of the cheese being wound, said support being movable to shift the cheese substantially horizontally to carry it out of driving contact with the drum, and means operative automatically in such movement to sustain the cheese holding means against downward movement comprising a ratchet member fixed relative to said arm and a pawl mounted on the support and biased for movement into engagement with said ratchet member.

13. In a winder having a cheese driving and traversing drum supported for rotation on a horizontal axis, a cheese carrier comprising a support mounted for movement in a direction transverse of the drum and cheese holder means including an arm pivotally mounted on said support for movement relative thereto as an incident to the growth of the cheese being wound, said support being movable to shift the cheese substantially horizontally to carry it out of driving contact with the drum, and means operative automatically in such movement to sustain the cheese holding means against downward movement, said means being ineffective in the winding position of the carrier.

14. In a winder having a cheese driving and traversing drum supported for rotation on a horizontal axis, a cheese carrier comprising a support mounted for movement in a direction transversely of the drum and cheese holding means comprising a rock shaft mounted on said support, a pair of arms at least one of which is fast on said shaft and having means at their free ends for rotatably supporting a cheese core, a ratchet member fixed on the shaft, and a pawl pivoted on the support and biased for movement into engagement with said ratchet member.

15. In a winder comprising a series of winding units and a tying unit mounted for relative traveling movement, said tying unit comprising a knotter and a cheese supporting and driving roll, each of said winding units comprising a winding drum mounted for rotation on a horizontal axis paralleling and horizontally spaced from said roll, a cheese carrier comprising a support mounted for movement in a direction transversely of the drum, and cheese holding means on the support, said support being biased for movement to carry the cheese substantially horizontally away from the drum into operative position above and upon the cheese supporting roll of the tying unit, and means for releasably holding the support with the cheese in driving contact with the drum.

16. In a winder comprising a series of winding units and a tying unit mounted for relative traveling movement, said tying unit comprising a knotter and a cheese supporting and driving roll, each of said winding units comprising a winding drum mounted for rotation on a horizontal axis, a cheese carrier comprising a support mounted for movement in a direction transversely of the drum, and cheese holding means on the support, said support being biased for movement in a direction to carry the cheese away from the drum into operative position above and upon the cheese supporting roll of the tying unit, means for releasably holding the support with the cheese in driving contact with the drum, and means for interrupting the movement of the carrier following release thereof from the winding position in a position disposed between said drum and said roll.

17. In a winder having a holder for a bobbin to be unwound, a driving and yarn traversing drum rotatable on a horizontal axis, a cheese carrier comprising a member mounted for movement in a direction transversely of the drum, means pivotally mounted on said member and adapted to hold the cheese in driving contact with the drum, spring means biasing said member for movement in a direction to carry a cheese out of driving contact with the drum, means releasably holding the member against movement by said spring means, means responsive to an interruption in the running strand extending from the bobbin to the cheese to release said member for movement by said spring means, and means rendered active in the initial movement of the cheese away from the drum to sustain said cheese holding means against downward movement in the continued movement of the carrier by said spring means.

18. In a winder having a holder for a bobbin to be unwound, a winding drum rotatable on a horizontal axis, a cheese carrier comprising an arm swingable on a horizontal axis spaced from the axis to the drum, a support mounting said carrier for bodily substantially horizontal movement of said axis, spring means urging said support substantially horizontally to move a cheese on said carrier out of driving contact with the drum, latch means holding the arm against movement by said spring means, and means operative automatically to disengage such latch means when the cheese attains a predetermined size or upon interruption of the running strand extending from the bobbin to the cheese.

19. In a winder having in combination a holder for a bobbin to be unwound, a winding drum, a cheese carrier comprising a supporting member bodily movable along a horizontal path toward and from the drum, and a cheese holding arm supported on said member and movable relative thereto to hold the cheese in driving contact with the drum during the operation of winding a strand from the bobbin onto the cheese, spring means biasing said member for movement in a direction to disengage the cheese from the driving drum, latch means for holding said member against movement by the spring means, a full size detector comprising a feeler member movable by said cheese holding arm as the size of the cheese increases, and means operative at a predetermined point in the movement of said feeler member to disengage said latch means.

20. A winder having, in combination, a rotary bobbin holder having means for supporting active and reserve bobbins, a winding drum rotatable on a horizontal axis, a cheese carrier comprising an arm swingable on an axis spaced below said drum and parallel thereto, spring means acting upon said arm to carry a cheese out of driving contact with the drum, latch means releasably holding the arm against movement by said springs means, and indexing means for the bobbin holder operatively connected with the carrier arm so that upon disengagement of the latch means to release the arm for movement by its spring means, said indexing means is actuated to reverse the relative positions of the active and reserve bobbins.

21. In a winder comprising a series of winding units and a tying unit mounted for relative traveling movement, said tying unit comprising a knotter and a cheese supporting and driving roll, each of said winding units comprising a winding drum mounted for rotation on a horizontal axis, a cheese carrier comprising a support mounted for movement in a direction transversely of the drum and cheese holding means on the support, said support being biased for movement in a direction to carry the cheese away from the drum into operative position upon the cheese supporting roll of the tying unit, means for releasably holding the support with the cheese in driving contact with the drum, means for interrupting the movement of the carrier following release thereof from the winding position in an intermediate position short of said operative position and said roll, and means operative in the relative traveling movement of the winding and tying units to release the cheese carrier from said intermediate position for movement into tying position.

22. In a winder comprising a series of winding units and a tying unit mounted for relative traveling movement, said tying unit comprising a knotter and a cheese supporting and driving roll, each of said winding units comprising a winding drum mounted for rotation on a horizontal axis, a cheese carrier comprising a support mounted for movement in a direction transversely of the drum and cheese holding means on the support, said support being biased for movement in a direction to carry the cheese away from the drum into operative position upon the cheese supporting roll of the tying unit, means for releasably holding the support with the cheese in driving contact with the drum, latch means for interrupting the movement of the carrier in an intermediate position following release thereof from the winding position and releasable to permit continued movement of the carrier, and means operative in the relative traveling movement of the winding and tying units first to release the cheese carrier from said intermediate position for movement into tying position and then to restore the cheese carrier with the cheese in driving contact with said winding drum.

23. In a machine for winding yarn from a bobbin onto a cheese, the combination of a winding unit having a support for the cheese while in winding position, a tying unit having a support for the cheese while in tying position, means for producing a relative traveling movement between the two units, a detector movable in response to an interruption of the strand extending from the bobbin to the cheese, and means for transferring the cheese from its winding position to its tying position including a control device on the winder unit actuated in response to movement of the detector to initiate the transferring operation to an inactive position, and means operative selectively when the cheese is in said inactive position and in a relative approaching movement of the two units to complete such transferring operation, said last mentioned means remaining ineffectual when the cheese is in said winding position as the winding and tying units become associated with each other.

24. A winder comprising a series of winding units and a tying unit mounted for relative traveling movement, said tying unit comprising a knotter and a cheese supporting and driving roll, each of said winding units comprising a winding drum, a cheese carrier comprising a support mounted for movement in a direction to carry the cheese from a winding position on the drum into a tying position upon the supporting roll of the tying unit, a support for a bobbin having a running strand leading therefrom to said cheese, means responsive to an interruption of the running strand for effecting movement of the carrier from a winding position with the cheese in contact with the winding drum to an intermediate position short of said tying position, and means operative selectively in the relative traveling movement between the tying unit and said winding units when the cheese is in said intermediate position for effecting movement of the cheese carrier from said intermediate position to said tying position.

25. In a winder comprising a winding unit and a tying unit mounted for relative traveling movement, said tying unit comprising a knotter and a cheese supporting and driving roll and said winding unit comprising a winding drum mounted for rotation on a horizontal axis, a cheese carrier comprising a support biased for movement in a direction to carry a cheese from a winding position on the drum toward a tying position upon the roll of the tying unit, means for releasably holding the support with the cheese in driving contact with the drum, means for interrupting the movement of the carrier in an intermediate position following release thereof from the winding position including a shiftable stop member and a part on said cheese carrier engageable with said stop member, and means operative in the relative traveling movement between the tying and winding units for actuating said shiftable stop member to disengage it from said part on the carrier whereby to effect continued movement of the carrier beyond said intermediate position to said tying position.

26. In a winder comprising a winding unit and a tying unit mounted for relative traveling movement, said tying unit comprising a knotter and a cheese supporting and driving roll and said winding unit comprising a winding drum mounted for rotation on a horizontal axis, a cheese carrier comprising a support biased for movement in a direction to carry a cheese from a winding position on the drum toward a tying position upon the roll of the tying unit, means for releasably holding the support with the cheese in driving contact with the drum, means for interrupting the movement of the carrier in an intermediate position following release thereof from the winding position including a shiftable stop member and a part on said cheese carrier engageable with said stop member, means operative in the relative traveling movement between the tying and winding units for actuating said shiftable stop member to disengage it from said part on the carrier whereby to effect movement of the carrier from said intermediate position to said tying position, said cheese carrier having means operative upon movement of the cheese out of driving contact with the drum to sustain the cheese against downward movement, and means also operative in the relative traveling movement between the winding and tying units to render the last mentioned means ineffective whereby to permit the cheese to rest upon said supporting roll of the tying unit.

27. In a winder having, in combination, a holder for a bobbin to be unwound, a winding drum, a cheese carrier having means for holding a cheese in driving contact with the drum during the operation of winding a strand from the bobbin onto the cheese, spring means biasing said member for movement in a direction to disengage the cheese from the driving drum, latch means for holding said member against movement by the spring means, an exhausted thread detector having a feeler element movable in response to an interruption in the running strand, a full size cheese detector, a device controlled by said full size detector and operative to sever the running strand, and means operative upon an interruption of the running strand whether by exhaustion or by severance thereof by said device to disengage said latch means.

28. In a winder having, in combination, a holder for a bobbin to be unwound, a winding drum, a cheese carrier, spring means for biasing said carrier for movement in a direction to disengage the cheese from the winding drum, latch means releasably holding the carrier in winding position, an exhausted thread detector having a feeler element movable in response to an interruption of the running strand, means controlled by said feeler element to release said latch means, a normally ineffective device for breaking the running strand, and means responsive to the growth of the cheese being wound to a predetermined size to effect actuation of the device and severance of the running strand.

29. In a winder having, in combination, a holder for a bobbin to be unwound, a winding drum, a cheese carrier, spring means for biasing said carrier for movement in a direction to disengage the cheese from the winding drum, latch means releasably holding the carrier in winding position, an exhausted thread detector having a feeler element movable in response to an interruption of the running strand, means controlled by said feeler element to release said latch means, a normally ineffective device for breaking the running strand, and means responsive to the growth of the cheese being wound to a predetermined size to effect actuation of the device and severance of the running strand, said bobbin holder comprising a rotatable support for the bobbin, means operative in the movement of the carrier to impart an indexing movement to said bobbin holder, and means operative in such movement of the bobbin holder to restore said device to inactive position.

30. In a winder having, in combination, a bobbin holder for supporting active and reserve bobbins, a winding drum, a cheese carrier having a normal position in which it holds a cheese in driving contact with the drum, spring means biasing said member for movement in a direction to disengage the cheese from the drum, latch means for holding said carrier against movement by the spring means, a thread detector having a feeler element movable in response to an interruption in the strand running from the active bobbin to the cheese, means responsive to the movement of said element for disengaging said latch means, a device including a member biased for movement in a strand-severing direction, detent means normally holding said member against movement, and means operative upon the growth of the cheese being wound to a predetermined size to disengage said detent means to render said device effective to sever the strand.

31. In a winder having, in combination, a bobbin holder for supporting active and reserve bobbins, a winding drum, a cheese carrier having a normal position in which it holds a cheese in driving contact with the drum and a tying position spaced from the drum, spring means biasing said member for movement in a direction to disengage the cheese from the drum, latch means for holding said carrier against movement by the spring means, a thread detector having a feeler element movable in response to an interruption in the strand running from the active bobbin to the cheese, means responsive to the movement of said element for disengaging said latch means, a device including a member biased for movement in a strand-severing direction, detent means normally holding said member against movement, and means operative upon the growth of the cheese being wound to a predetermined size to disengage said detent means to render said device effective to sever the strand, said bobbin holder being operatively connected with the cheese carrier for movement thereby so as to reverse the relative positions of the active and reserve bobbins upon movement of the cheese carrier into tying position, and means operative in the indexing movement of the bobbin holder to re-engage said member with said detent means.

32. In a winding machine, the combination of, a support for a cheese, a holder for supporting a bobbin having a thread extending to said cheese, means for driving the cheese to wind said thread thereon, means for sensing the winding of the cheese to a predetermined diameter, a clamp having relatively movable jaws for gripping the thread between the cheese and bobbin, and means controlled by said sensing means and operating when the cheese has attained said predetermined diameter to close said jaws together and grip the thread with sufficient pressure to force a break in the thread.

33. In a winder, the combination of, a winding drum rotatable about a horizontal axis, a support movable back and forth along a path extending transversely of said axis, an arm pivoted at one end on said support to swing about an axis paralleling said drum axis, means on the other end of said arm for rotatably supporting a yarn package, spring means urging said support along said path to carry said package away from the drum, means for holding said support with the package in driving contact with the drum but releasable to permit the support, said arm and said package to move as a unit out of winding position along said path, a normally released brake on said arm adapted when energized to apply a retarding torque to said package, a member mounted on said arm for movement in opposite directions relative thereto to apply and release the brake, a latch movable into and out of the path of said member to block or release the same after movement of said package out of winding position, said member, when blocked by said latch, being moved relative to said arm by the force of said spring in a direction to apply said brake, and means for releasing said latch to permit continued advance of said support and arm by said spring means and retraction of said member to release said brake.

34. In a winder, the combination of, a winding unit and a tying unit mounted for relative movement along a predetermined path, said tying unit including a knotter and an end finding roll, and said winding unit including a rotary drum, a carrier supporting a cheese for horizontal movement between a winding position in contact with and above the drum and a tying position in contact with and above said roll, means for sensing the interruption of a strand extending to the cheese in winding position and initiating movement of said carrier toward said tying position, and releasable means operable upon separation of the cheese from said drum to sustain the weight of the cheese against downward movement.

35. In a winder, the combination of, a winding unit and a tying unit mounted for relative movement along a predetermined path, said tying unit including a knotter and an end finding roll, and said winding unit including a rotary drum, a carrier supporting a cheese for horizontal movement between a winding position in contact with and above said drum and a tying position in contact with and above said roll, means for sensing the interruption of a strand extending to the cheese in winding position and initiating movement of said carrier toward said tying position, releasable means operable upon separation of the cheese from said drum to sustain the weight of the cheese against downward movement, and mechanism subsequently operable in response to relative movement between said units along said path to release said sustaining means and lower the cheese onto said roll.

36. A machine for combining the thread of a plurality of bobbins into a larger package having, in combination, a plurality of units disposed side by side and individually operable to wind separate packages by contact of the package with a rotating drum, each of said units including a holder for supporting a bobbin in winding position, means supporting the package for movement between a first position of active engagement with said drum, an intermediate position out of such engagement, and a third tying position spaced beyond the intermediate position, means operable in response to the interruption of the thread between the bobbin and the package during winding of the latter to effect movement of the package to said intermediate position, mechanism operable to find the broken thread of one package and tie the same to the thread of a new bobbin, means supporting said mechanism and said units and moving the same relative to each other to present the successive units to the mechanism, and means operable in response to the disposal of a package in said intermediate position when approaching said mechanism to initiate movement of the package to said tying position, to substitute a new bobbin in winding position in said holder and to activate said mechanism to tie the thread of such bobbin to the broken thread of the package, said last mentioned means being held inactive as the mechanism and each successive unit pass each other if the package of the unit is in said active position.

37. A winder having, in combination, a tying unit movable along a rectilinear path and including a knotter and an end finding roll rotatable about a horizontal axis paralleling said path, a winding drum rotatable about an axis paralleling and horizontally spaced from said roll axis, a bobbin holder rotatable about an upright axis and disposed below said drum, said holder supporting laterally spaced active and reserve bobbins with the reserve bobbin disposed adjacent said path, a carrier for supporting a cheese for movement in a generally horizontal path back and forth between said roll and drum, a thread of said active bobbin extending to said cheese, a holder gripping the thread of said reserve bobbin in said holder and movable into and out of said path, means operable upon breakage of said active bobbin thread to initiate movement of said cheese away from said drum and toward said path, means operating in timed relation to the movement of said tying unit along said path to move said cheese into said path and into operative association with said roll, and mechanism operating as an incident to said last mentioned movement of said cheese to turn said bobbin holder and reverse the positions of said active and reserve bobbins and move said thread holder outwardly into said path to bring said reserve thread into operative association with said tying unit.

38. In a winder of the character described, the combination of, a winding drum rotatable about a horizontal axis, an upright lever fulcrumed intermediate its ends to swing about a horizontal axis disposed below and paralleling said drum axis, an arm fulcrumed on the free upper end of said lever to swing about an axis paralleling said drum, means on the free end of said arm to support a cheese in driving contact with the top of the drum, a spring urging said lever and said arm in a direction to carry said cheese generally horizontally out of contact with said drum, a latch normally holding said lever retracted with said cheese contacting the drum but releasable to permit the cheese to move away from the drum, a holder for supporting spaced bobbins and movable to transfer the bobbins between active and reserve positions, and means coupled to the lower end of said lever and operable to actuate said bobbin holder during the movement of said cheese away from said drum.

39. In a winder of the character described, the combination of, a winding drum rotatable about a horizontal axis, an upright lever fulcrumed to swing about a horizontal axis disposed below and paralleling said drum axis, an arm fulcrumed on the free upper end of said lever to swing about an axis paralleling said drum, means on the free end of said arm to support a cheese in driving contact with the top of the drum, a spring urging said lever and said arm in a direction to carry said cheese generally horizontally out of contact with said drum, and a latch normally holding said lever retracted with said cheese contacting the drum but releasable to permit the cheese to move away from the drum.

References Cited in the file of this patent

UNITED STATES PATENTS

| | | |
|---|---|---|
| 1,102,214 | Ewing | June 30, 1914 |
| 1,311,788 | Abbott | July 29, 1919 |
| 1,539,076 | Colman | May 26, 1925 |
| 1,571,925 | Abbott | Feb. 9, 1926 |
| 1,801,378 | Swanson | Apr. 21, 1931 |
| 1,958,060 | McKean | May 8, 1934 |
| 1,972,950 | Peterson | Sept. 11, 1934 |
| 2,107,020 | Williams | Feb. 1, 1938 |
| 2,177,680 | Abbott | Oct. 31, 1939 |
| 2,363,988 | Peterson | Nov. 28, 1944 |
| 2,365,701 | Higgins | Dec. 26, 1944 |
| 2,367,768 | Gibbs et al. | Jan. 23, 1945 |
| 2,407,366 | Cotchett et al. | Sept. 10, 1946 |
| 2,408,135 | Cotchett | Sept. 24, 1946 |
| 2,592,599 | Perry | Apr. 15, 1952 |
| 2,650,035 | Egee | Aug. 25, 1953 |
| 2,680,572 | Stange | June 8, 1954 |